US012065999B2

(12) United States Patent
Lou et al.

(10) Patent No.: US 12,065,999 B2
(45) Date of Patent: Aug. 20, 2024

(54) MODULAR WAVE ENERGY CONVERTER

(71) Applicant: E-Wave Technologies LLC, Poughkeepsie, NY (US)

(72) Inventors: Junhui Lou, Tenafly, NJ (US); Adam Bennett, Hoboken, NJ (US); Lei Zuo, Ann Arbor, MI (US); Mingyi Liu, Blacksburgh, VA (US); Fujun Ruan, Pittsburgh, PA (US); Jia Mi, Blacksburg, VA (US)

(73) Assignee: E-Wave Technologies, LLC, Poughkeepsie, NY (US)

( * ) Notice: Subject to any disclaimer, the term of this patent is extended or adjusted under 35 U.S.C. 154(b) by 0 days.

(21) Appl. No.: 18/466,068

(22) Filed: Sep. 13, 2023

(65) Prior Publication Data

US 2024/0003326 A1 Jan. 4, 2024

Related U.S. Application Data

(63) Continuation of application No. 17/971,026, filed on Oct. 21, 2022, now Pat. No. 11,795,903.

(Continued)

(51) Int. Cl.
*F03B 13/18* (2006.01)

(52) U.S. Cl.
CPC .......... *F03B 13/185* (2013.01); *F03B 13/182* (2013.01); *F03B 13/1865* (2013.01); *Y02E 10/30* (2013.01)

(58) Field of Classification Search
CPC ...... F03B 13/16; F03B 13/18; F03B 13/1845; F03B 13/185; F03B 13/1865; F03B 13/1885; F03B 13/14–13/24; Y02E 10/30
See application file for complete search history.

(56) References Cited

U.S. PATENT DOCUMENTS

| 1,379,183 A | 5/1921 | Harris |
| 2010/0133842 A1* | 6/2010 | Lin ............... F03B 13/186 290/53 |

(Continued)

FOREIGN PATENT DOCUMENTS

| DE | 102010005395 A1 | 1/2011 |
| WO | 2011023840 A1 | 3/2011 |

OTHER PUBLICATIONS

Coiro et al. "Experimental test and numerical shape optimization of a point pivoted absorber for wave energy conversion." Marine VI: proceedings of the VI International Conference on Computational Methods in Marine Engineering. CIMNE, 2015.

(Continued)

*Primary Examiner* — Loren C Edwards
(74) *Attorney, Agent, or Firm* — Sunstein LLP

(57) ABSTRACT

A modular wave energy converter includes: a forward attachment frame; forward guide rails coupled to the forward attachment frame; a forward paddle coupled to the forward guide rails; and one or more forward tethers coupled to the forward paddle and the shaft. A combination of heave and surge forces from waves of water causes the forward paddle moves up and down the forward guide rails. The movement of the forward paddle moves the one or more forward tethers. The movement of the one or more forward tethers causes the shaft to rotate via the rotation of winches. The winches are configured with a one-way clutch, which allows the shaft to rotate in a first direction but not a second. The converter has the same structure on the aft side, including an aft paddle. The forward and aft paddles are positioned vertically or inclined.

17 Claims, 24 Drawing Sheets

Related U.S. Application Data

(60) Provisional application No. 63/264,669, filed on Nov. 30, 2021, provisional application No. 63/270,711, filed on Oct. 22, 2021.

(56) References Cited

U.S. PATENT DOCUMENTS

| | | |
|---|---|---|
| 2011/0068579 A1 | 3/2011 | Dullaway |
| 2012/0161445 A1* | 6/2012 | Lee .................... F03B 13/1845 290/53 |
| 2012/0186244 A1 | 7/2012 | Pedersen |
| 2012/0261923 A1 | 10/2012 | Hassavari |

OTHER PUBLICATIONS

Coiro et al. "Numerical And Experimental Tests on a Scaled Model of a Point Pivoted Absorber for Wave Energy Conversion", 2nd Asian Wave and Tidal Energy Conference (AWTEC), Tokyo, 2014.

Brando et al. "Perturb and Observe Control for an Embedded Point Pivoted Absorber", Energies 9.11 (2016): 939.

Jusoh et al. "Investigations of Hydraulic Power Take-Off Unit Parameters Effects on the Performance of the WAB-WECs in the Different Irregular Sea States", Journal of Marine Science and Engineering 9.8 (2021): 897.

Albert et al. "Mechanical design and simulation of an onshore four-bar wave energy converter", Renewable Energy 114 (2017): 766-774.

Coiro et al. "Wave energy conversion through a point pivoted absorber: Numerical and experimental tests on a scaled model", Renewable Energy 87 (2016): 317-325.

Castellini et al. "Experimental tests on a wave-to-wire pivoted system for wave energy exploitation", 2017 6th International Conference on Clean Electrical Power (ICCEP). IEEE, 2017.

Bruzzone et al. "Reinforcement Learning control of an onshore oscillating arm Wave Energy Converter", Ocean Engineering 206 (2020): 107346.

You et al. "Non-Scattering Geometry of Wave Energy Converter", Acta Mechanica Sinica, Jan. 3, 2020, 10 pages.

Todalshaug "Hydrodynamics of WECs" Pecher A., Kofoed J. (eds), Handbook of Ocean Wave Energy. Ocean Engineering & Oceanography, vol. 7, pp. 139-158, 2017.

Todalshaug "Practical limits to the power that can be captured from ocean waves by oscillating bodies," International Journal of Marine Energy, vol. 3-4, pp. e70-e81, Dec. 2013.

Salter "Wave Power". Nature 249, pp. 720-724, Jul. 1974.

Mi et al. "Design, modelling, and testing of a vibration energy harvester using a novel half-wave mechanical rectification", Applied Energy, vol. 279: 115726, Dec. 2020.

Madhi et al. "The 'Berkeley Wedge': an Asymmetrical Energy-Capturing Floating Breakwater of High Performance", Marine Systems & Ocean Technology, vol. 9, No. 1, 2014, pp. 5-16.

Falnes, J., "A review of wave-energy extraction", Marine Structures. 20. 185-201, Sep. 2007.

Henderson, R., "Design, simulation, and testing of a novel hydraulic power take-off system for the Pelamis wave energy converter", Renewable energy. vol. 31, Issue 2, pp. 273-283, Sep. 2005.

International Searching Authority—Invitation to Pay Additional Fees, pertaining to International Application No. PCT/US2022/047503 dated Feb. 17, 2023, together with the Provisional Opinion Accompanying the Partial Search Result, 9 pages.

* cited by examiner

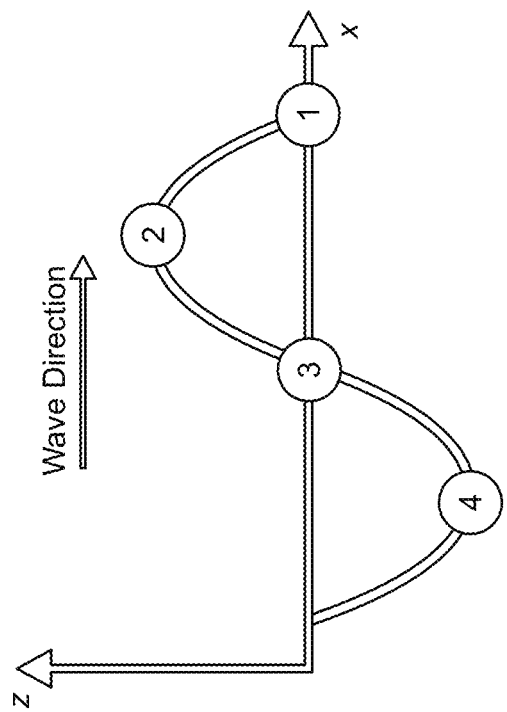
FIG. 17A
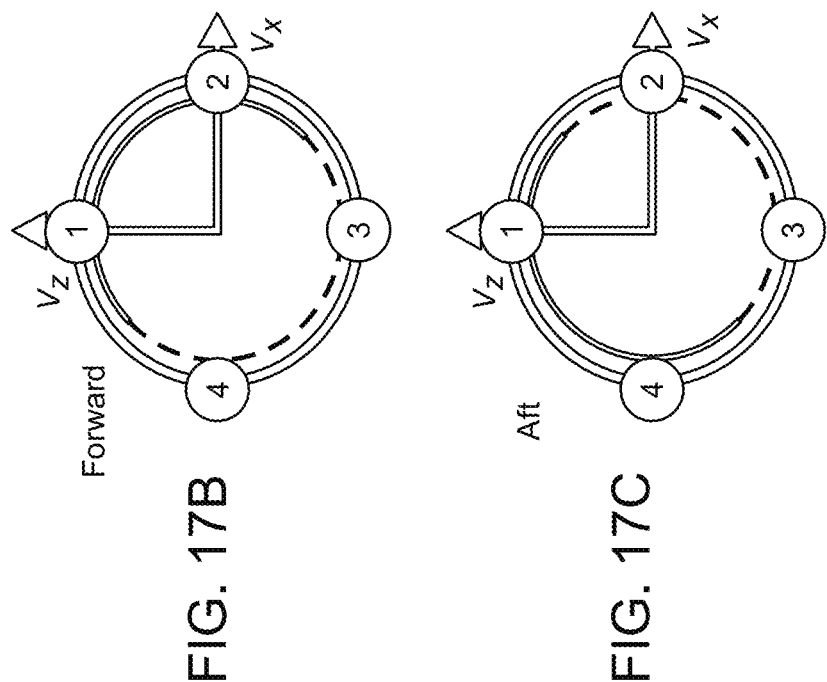
FIG. 17B
FIG. 17C

MODULAR WAVE ENERGY CONVERTER

CROSS-REFERENCE TO RELATED APPLICATIONS

The present application is a continuation application of co-pending U.S. patent application Ser. No. 17/971,026, titled "Modular Wave Energy Converter", filed on Oct. 21, 2022, which claims priority to U.S. Provisional Patent Application Ser. No. 63/270,711, entitled "On-Site Alternative Power Solution for Aquaculture" and filed Oct. 22, 2021, and to U.S. Provisional Patent Application Ser. No. 63/264,669, entitled "Modular Wave Energy Converter Retrofitted to Offshore Aquaculture Farms" and filed on Nov. 30, 2021. The foregoing applications are incorporated herein by reference in their entireties.

BACKGROUND OF THE INVENTION

Wave energy converters use either direct-drive power take-off system or indirect-drive power take-off systems. The conventional wave energy converters with direct-drive power take-off systems typically use linear electromagnetic generators without intermediate steps. These systems are heavy, inefficient, and expensive. Some wave energy converters with indirect-drive power take-off systems use hydraulic or pneumatic fluid to drive a rotational generator. The fluid drive of these systems introduces efficiency loss, increased complexity, and reduced reliability, especially when not in an ideal operating point. Some wave energy converters with indirect-drive power take-off systems use rack pinions or ball screws. The mechanical drive of these systems provides high compactness and efficiency, but the cost and reliability in ocean environments are of concern.

BRIEF SUMMARY OF THE INVENTION

Disclosed herein are embodiment of a wave energy converter with forward and aft paddles as specified in the independent claims. Embodiments of the present invention are given in the dependent claims. Embodiments of the present invention can be freely combined with each other if they are not mutually exclusive.

According to one embodiment, a modular wave energy converter includes: a power take-off system, the power take-off system including a shaft, the shaft being coupled to a generator; a forward attachment frame coupled to a forward side; an aft attachment frame coupled to an aft side; forward guide rails coupled to the forward attachment frame; aft guide rails coupled to the aft attachment frame; a forward paddle coupled to the forward guide rails and configured to move up and down the forward guide rails; an aft paddle coupled to the aft guide rails and configured to move up and down the aft guide rails; one or more forward tethers coupled to the forward paddle and the shaft, where the one or more forward tethers includes: a driving tether of a first forward set, a retrieval tether of the first forward set, a driving tether of a second forward set, and a retrieval tether of the second forward set, one or more aft tethers coupled to the aft paddle and the shaft, where the one or more aft tethers includes: a driving tether of a first aft set, a retrieval tether of the first aft set, a driving tether of a second aft set, and a retrieval tether of the second aft set, where in response to a combination of heave and surge forces from waves of water, the forward paddle moves up and down the forward guide rails and the aft paddle moves up and down the aft guide rails, where the movement of the forward paddle moves the one or more forward tethers and the movement of the aft paddle moves the one or more aft tethers, where the movement of the one or more forward tethers and the movement of the one or more aft tethers cause the shaft to rotate.

According to another embodiment, a modular wave energy converter, includes: a power take-off system, the power take-off system including a shaft, the shaft being coupled to a generator; a forward attachment frame coupled to a forward side, the forward attachment frame including: a forward rectangular shaped frame portion, including a first forward vertical bar, a second forward vertical bar, a forward top horizontal bar, and a forward bottom horizontal bar of the forward rectangular shaped frame portion; a first forward triangular shaped frame portion, including: a first forward horizontal bar and a first forward inclined bar, where the first forward horizontal bar includes a first end and a second end, the first end of the first forward horizontal bar coupled to a bottom of the first forward vertical bar of the forward rectangular shaped frame portion, and the second end of the first forward horizontal bar projecting outward from the bottom of the first forward vertical bar of the forward rectangular shaped frame portion, where the first forward inclined bar includes a first end and a second end, the first end of the first forward inclined bar coupled to a top of the first forward vertical bar of the forward rectangular shaped frame portion, and the second end of the first forward inclined bar coupled to the second end of the first forward horizontal bar; a second forward triangular shaped frame portion, including: a second forward horizontal bar and a second forward inclined bar, where the second forward horizontal bar includes a first end and a second end, the first end of the second forward horizontal bar coupled to a bottom of the second forward vertical bar of the forward rectangular shaped frame portion, and a second end of the second forward horizontal bar projecting outward from the bottom of the second forward vertical bar of the forward rectangular shaped frame portion, where the second forward inclined bar includes a first end and a second end, the first end of the second forward inclined bar coupled to a top of the second forward vertical bar of the forward rectangular shaped frame portion, and the second end of the second forward inclined bar coupled to the second end of the second forward horizontal bar, a forward bottom bar including a first end and a second end, the first end of the forward bottom bar coupled to the second end of the first forward inclined bar, and the second end of the forward bottom bar coupled to the second end of the second forward inclined bar; and forward guide rails including top ends and bottom ends, the top ends of the forward guide rails coupled to the forward top horizontal bar of the forward rectangular shaped frame portion and the bottom ends of the forward guide rails are coupled to the forward bottom bar; a forward paddle coupled to the forward guide rails between the top ends and the bottom ends of the forward guide rails, the forward paddle configured to move up and down the forward guide rails; one or more forward tethers coupled to the forward paddle and the shaft, where in response to a combination of heave and surge forces from waves of water, the forward paddle moves up and down the forward guide rails, where the movement of the forward paddle moves the one or more forward tethers, wherein the movement of the one or more forward tethers causes the shaft to rotate.

BRIEF DESCRIPTION OF DRAWINGS

FIGS. 17A-17C illustrates the wave-paddle interaction for the modular wave energy converter.

DETAILED DESCRIPTION OF THE INVENTION

The present invention provides a modular wave energy converter. The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment," "an embodiment," "an exemplary embodiment," "some embodiments," or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

Figure 1:
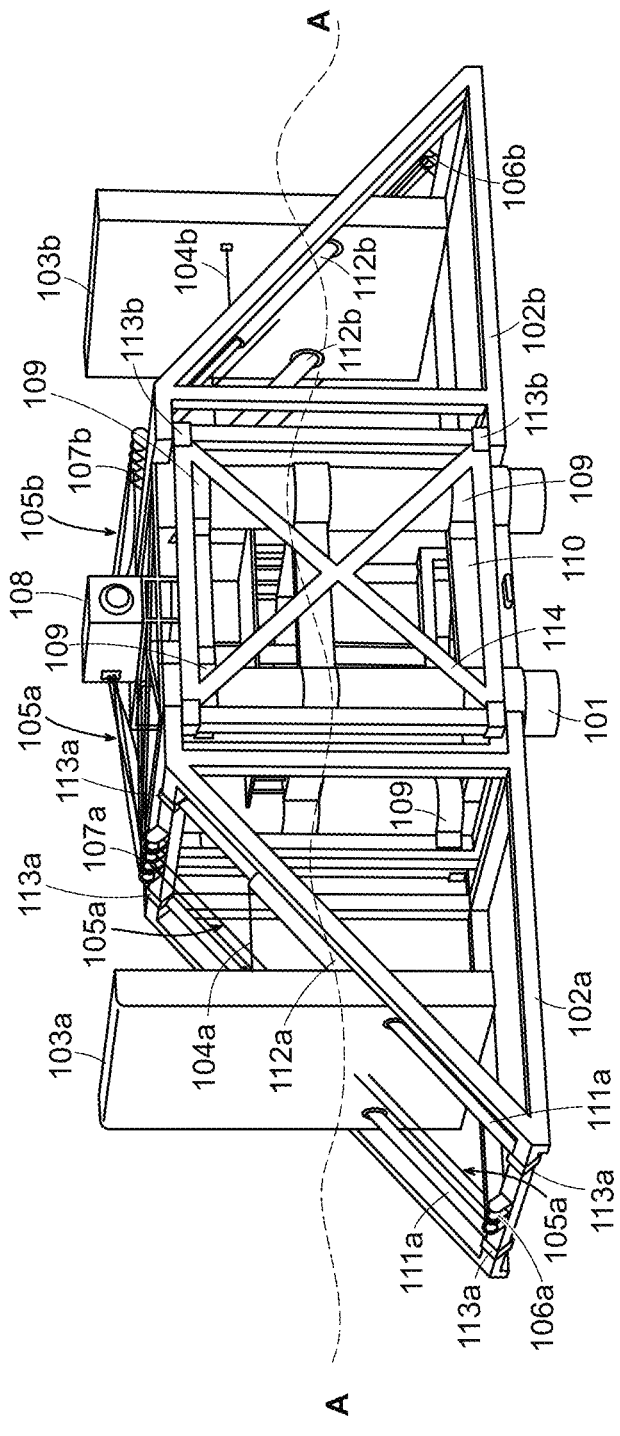
FIG. 1 illustrates a perspective view of a modular wave energy converter.
Figure 2:
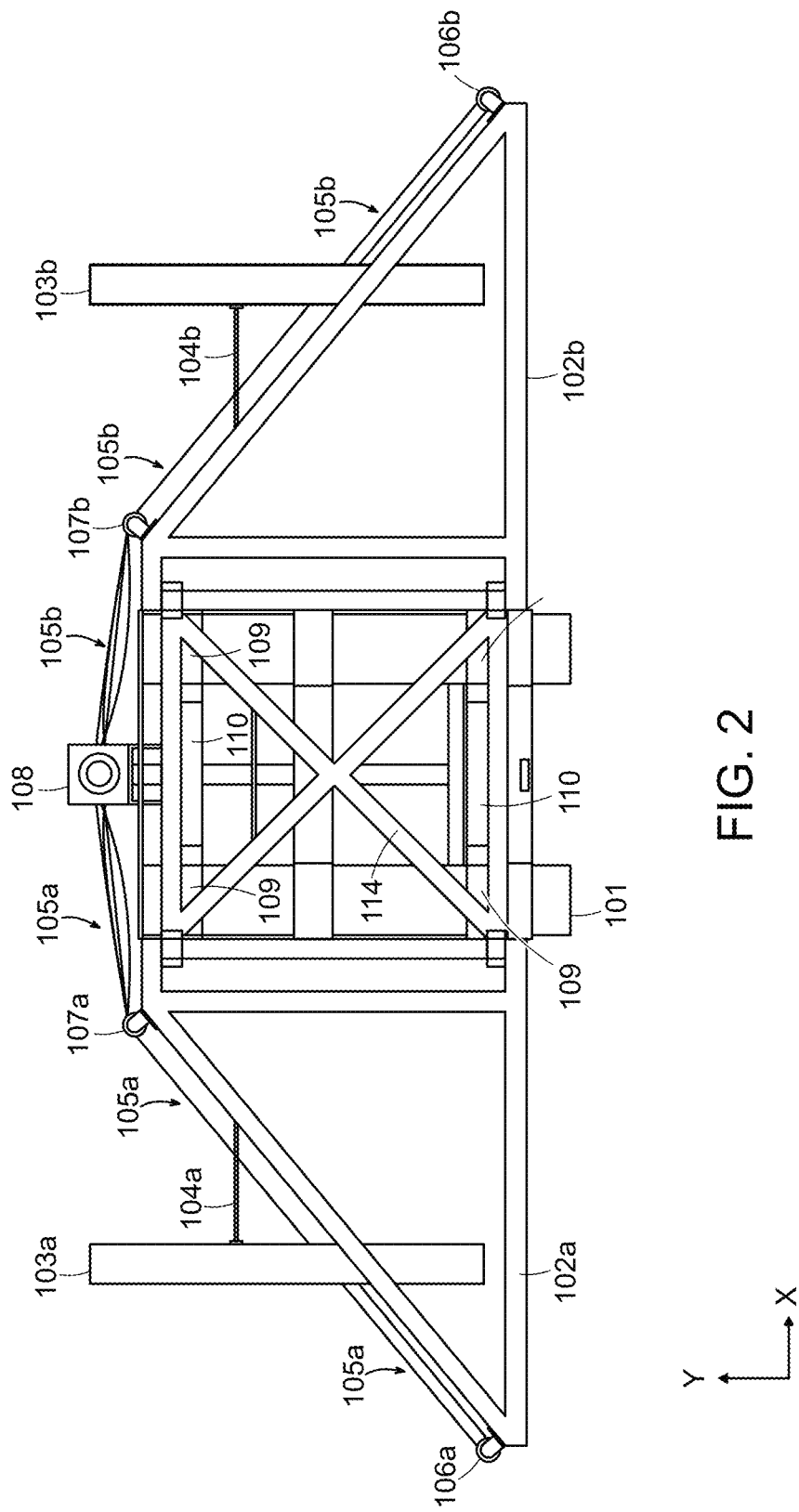
FIGS. 2, 3, and 4 illustrate a side view, a top view, and a bottom view, respectively, of the modular wave energy converter.
Figure 3:
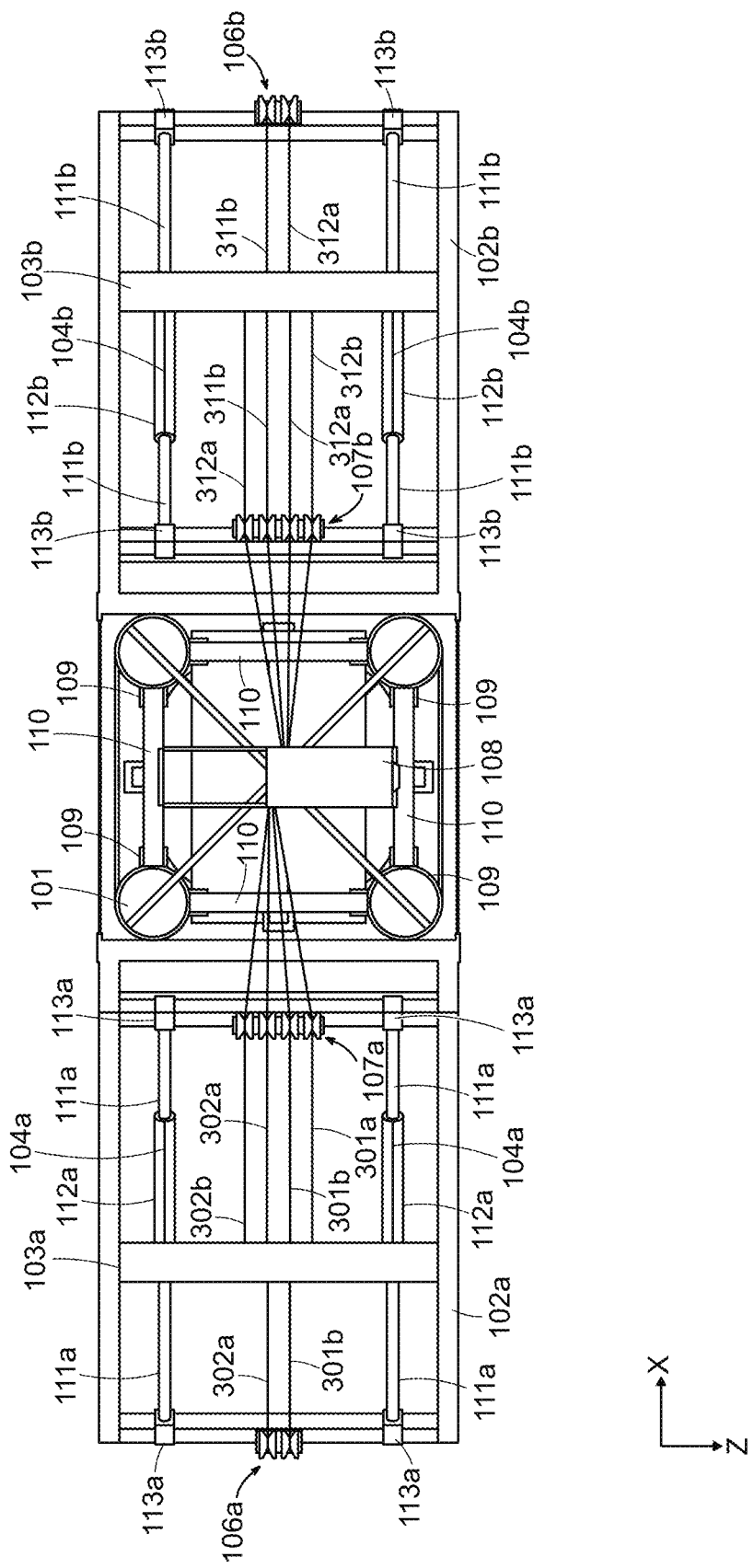
Figure 4:
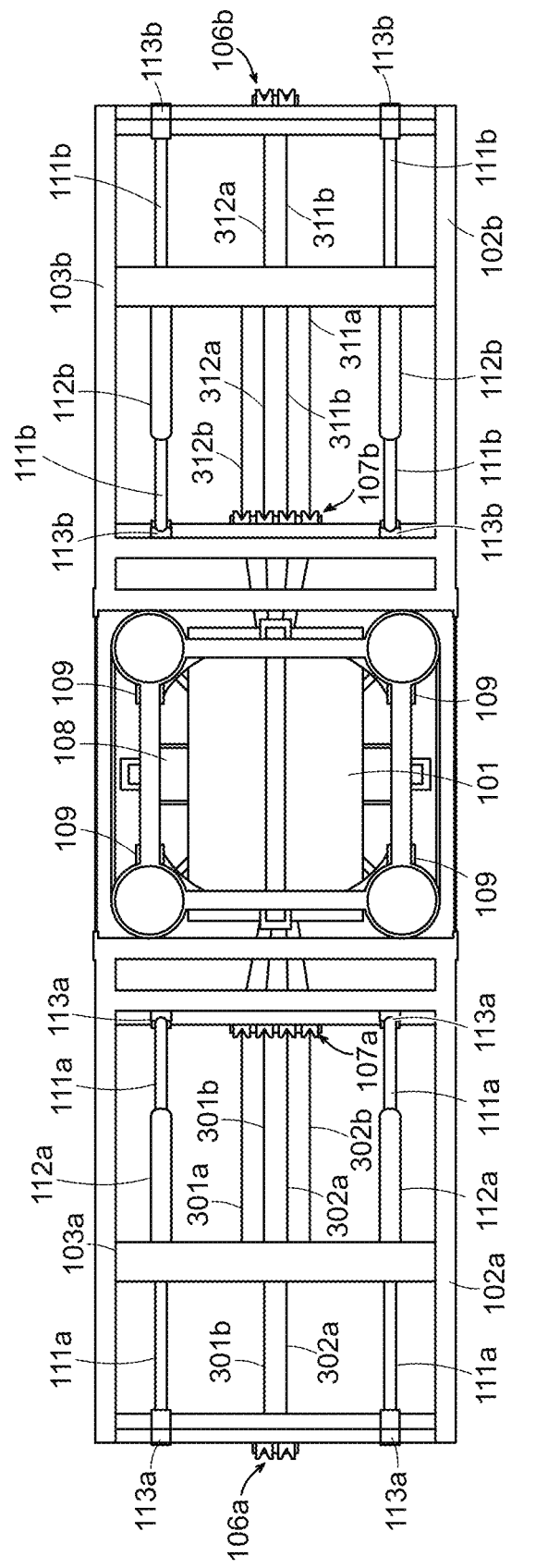
Figure 5:
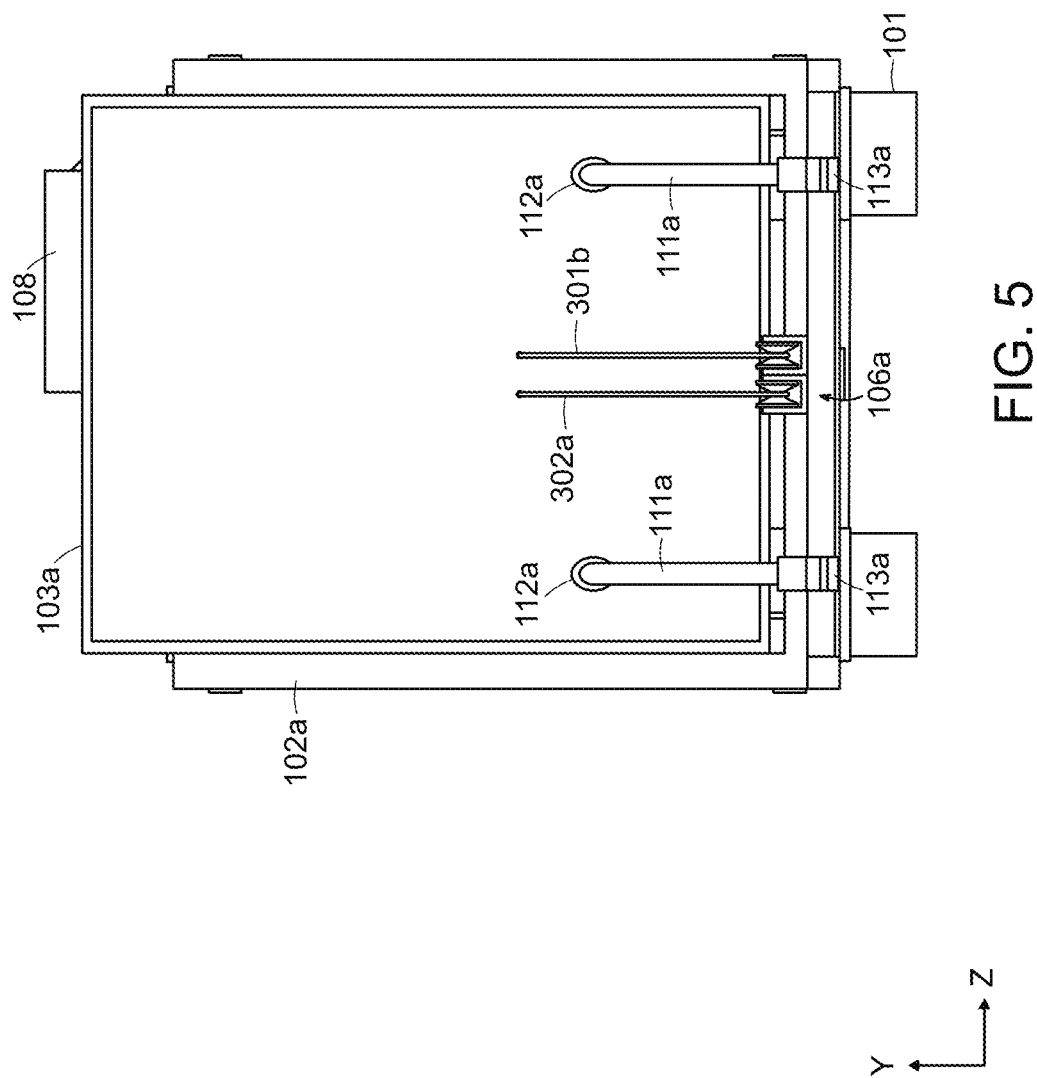
FIG. 5 illustrates an end view at the forward side of the modular wave energy converter.
Figure 6:
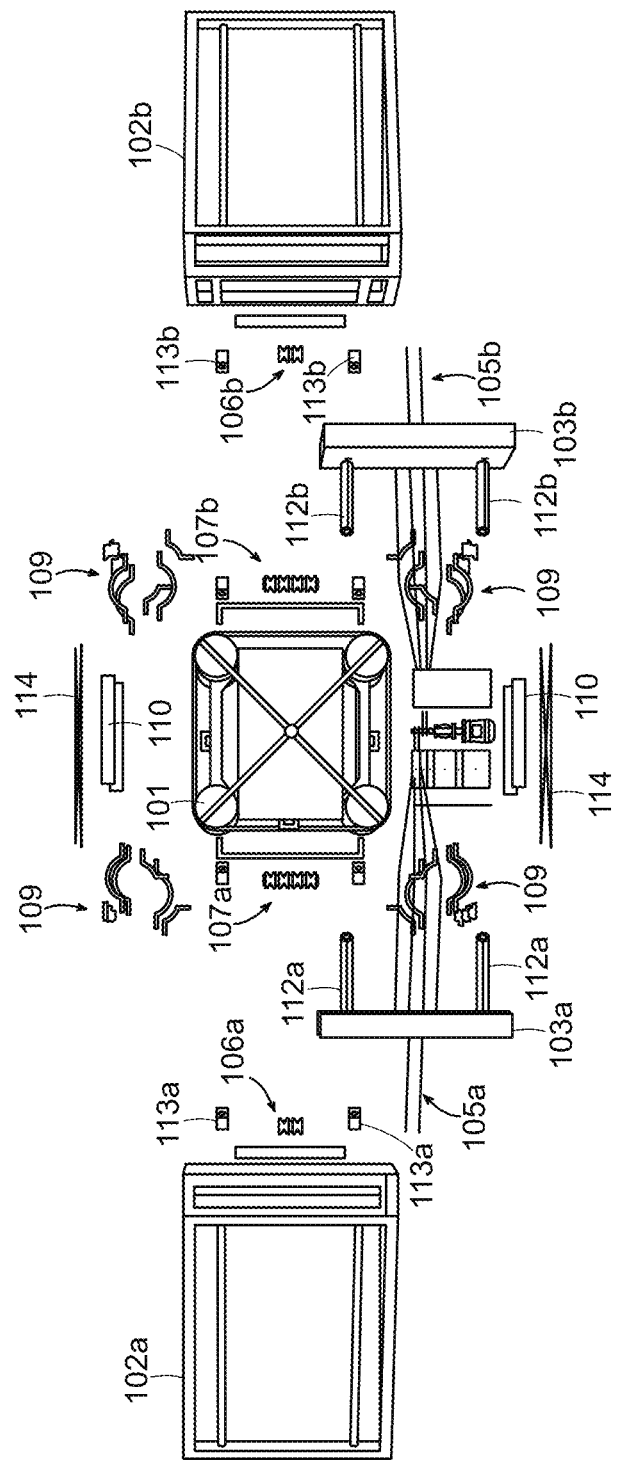
FIG. 6 illustrates an exploded view of the modular wave energy converter.

The Figures use the following reference numerals:
- 101 Feed buoy
- 102a-102b Forward and aft attachment frames
- 103a-103b Forward and aft paddles
- 104a-104b Forward and aft support trusses
- 105a-105b Forward and aft tethers
- 106a-106b Forward and aft lower pulleys
- 107a-107b Forward and aft upper pulleys
- 108 Power take-off system
- 109 Clamps
- 110 Crossbars
- 111a-111b Forward and aft guide rails
- 112a-112b Forward and aft sleeves
- 113a-113b Forward and aft guide rail connectors
- 114 Cross frame
- 301a-301b First set of forward tethers
  - 301a driving tether of first forward set
  - 301b retrieval tether of first forward set
- 302a-302b Second set of forward tethers
  - 302a driving tether of second forward set
  - 302b retrieval tether of second forward set
- 311a-311b First set of aft tethers
  - 311a driving tether of first aft set
  - 311b retrieval tether of first aft set
- 312a-312b Second set of aft tethers
  - 312a driving tether of second aft set
  - 312b retrieval tether of second aft set
- 901 Connection for retrieval tether 301b of first forward set
- 902 Port for retrieval tether 301b of first forward set
- 903 Connection for driving tether 302a of second forward set
- 904 Port for driving tether 302a of second forward set
- 905 Connection for driving tether 301a of first forward set
- 906 Connection for retrieval tether 302b of second forward set
- BP1-BP2 Bottom pulleys in forward lower pulleys 106a
- UP1-UP4 Upper pulleys in forward upper pulleys 107a
- 1101 First set of winches for forward paddle 103a
- 1102 Second set of winches for aft paddle 103b
- 1110 First winch of the first set of winches
- 1120 Second winch of the first set of winches
- W1 First winch portion of the first winch
- W2 Second winch portion of the first winch
- W3 First winch portion of the second winch
- W4 Second winch portion of the second winch
- 1401 First shaft coupler of power take-off system 108
- 1402 Gearbox of power take-off system 108
- 1403 Second shaft coupler of power take-off system 108
- 1404 Generator of power take-off system 108
- 1405 Housing of power take-off system 108
  - 1405a First side cover
  - 1405b Base plate
  - 1405c Top cover
  - 1405d Second side cover
- 1406 Ball bearings
- 1407 One-way clutches
- 1408a-1408b First and second shafts
- 1409 Drainage holes
- 1801a-1801b Forward and aft paddles for the second alternative embodiment
- 1802a-1802b Forward and aft tethers for the second alternative embodiment 1803a-1803b Forward and aft trusses for the second alternative embodiment
1804a-1804b Forward and aft attachment frames for the second alternative embodiment
1805a-1805b Forward and aft guide rails for the second alternative embodiment
1806a-1806b Forward and aft sleeves for the second alternative embodiment
2101a-2101b Forward and aft flaps for the third alternative embodiment
2102a-1202b Forward and aft tethers for the third alternative embodiment
2103a-2103b Forward and aft hingers for the third alternative embodiment
2104a-2104b Forward and aft attachment frames for the third alternative embodiment
2301a-2301b Forward and aft paddles for the first alternative embodiment FIG. 1 illustrates a perspective view of a modular wave energy converter. FIGS. 2, 3, and 4 illustrate a side view, a top view, and a bottom view, respectively. FIG. 5 illustrates an end view at the forward side. The end view at the aft side is a mirror of the end view at the forward side. FIG. 6 illustrates an exploded view of the modular wave energy converter. The modular wave energy converter (WEC) is coupled to a feed buoy 101. The feed buoy 101 can be an existing platform, where the WEC is retrofitted onto the platform 101. The feed buoy platform includes crossbars 110 coupled to the feed buoy 101 via clamps 109. A cross frame 114 provides additional structural integrity to the platform.

Coupled to a forward side of the feed buoy 101, via a forward attachment frame 102a, is a forward paddle 103a. Coupled to an aft side of the feed buoy 101, via an aft attachment frame 102b, is an aft paddle 103b. The forward paddle 103a is coupled to the forward attachment frame 102a via inclined forward guide rails 111a. In this embodiment, the forward paddle 103a is oriented in a vertical position. At the interface between the forward paddle 103a and the forward guide rails 111a are forward sleeves 112a. The forward support trusses 104a are coupled to the forward paddle 103a on one end and coupled to the forward sleeves 112a on the other end. The forward guide rails 111a are coupled to the forward attachment frame 102a via forward guide rail connectors 113a. The forward paddle 103a is able to move up and down the forward guide rails 111a. Similarly, the aft paddle 103b is coupled to the aft attachment frame 102b via inclined aft guide rails 111b. In this embodiment, the aft paddle 103b is oriented in a vertical position. At the interface between the aft paddle 103b and the aft guide rails 111b are aft sleeves 112b. The aft paddle 103b is coupled to the aft sleeves 112b. The aft support trusses 104b are coupled to the aft paddle 103b on one end and coupled to the aft sleeves 112b on the other end. The aft guide rails 111b are coupled to the aft attachment frame 102b via aft guide rail connectors 113b. The aft paddle 103b is able to move up and down the aft guide rails 111b.

On the forward side, the WEC further includes a first set of forward tethers 301a-301b and a second set of forward tethers 302a-302b. (See FIG. 3.) The first set of forward tethers includes a driving tether 301a and a retrieval tether 301b. The second set of forward tethers includes a driving tether 302a and a retrieval tether 302b. The retrieval tether 301b of the first forward set and the driving tether 302a of the second forward set are coupled to forward lower pulleys 106a. The first and second sets of forward tethers 301a-301b and 302a-302b are coupled to and traverse forward upper pulleys 107a and are coupled to the power take-off system 108. The first and second sets of forward tethers 301a-301b and 302a-302b move when the forward paddle 103a moves, and this movement is used to generate power, as described further below.

On the aft side, the WEC further includes a first set of aft tethers 311a-311b and a second set of aft tethers 312a-312b. The first set of aft tethers includes a driving tether 311a and a retrieval tether 131b. The second set of aft tethers also includes a driving tether 312a and a retrieval tether 312b. The retrieval tether 131b of the first aft set and the driving tether 312a of the second aft set are coupled to aft lower pulleys 106b. The first and second sets of aft tethers 311a-131b and 312a-312b are coupled to and traverse aft upper pulleys 107b and coupled to the power take-off system 108. The first and second sets of aft tethers 311a-131b and 312a-312b move when the aft paddle 103b moves, and this movement is used to generate power, as described further below.

When deployed, the feed buoy is coupled to a mooring system (not shown), where the forward and aft paddles 103a-103b are partially submerged. Line A in FIG. 1 illustrates an example water line. The WEC is positioned such that the forward and aft paddles 103a-103b are excited by incident waves and oscillate along the forward and aft guide rails 111a-111b.

Figure 7:
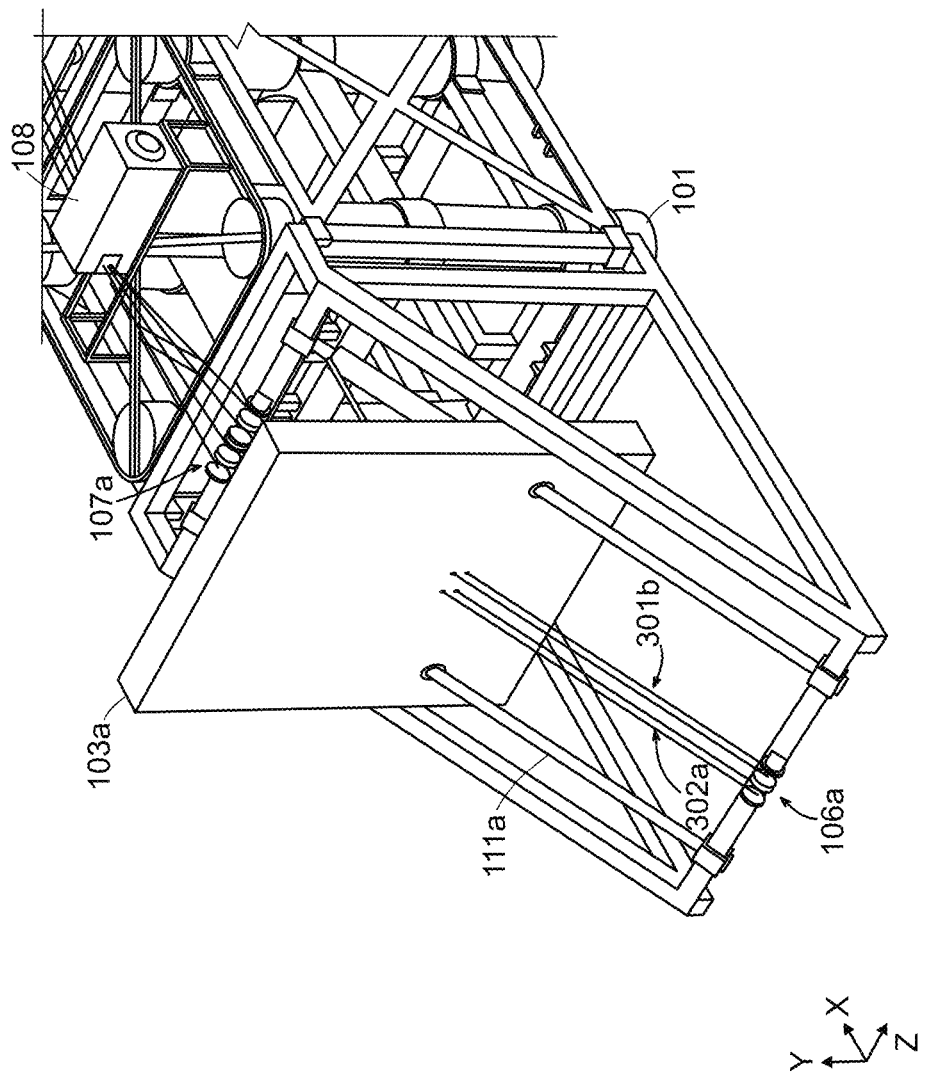
FIG. 7 illustrates the forward paddle in an upper position on the forward guide rails.
Figure 8:
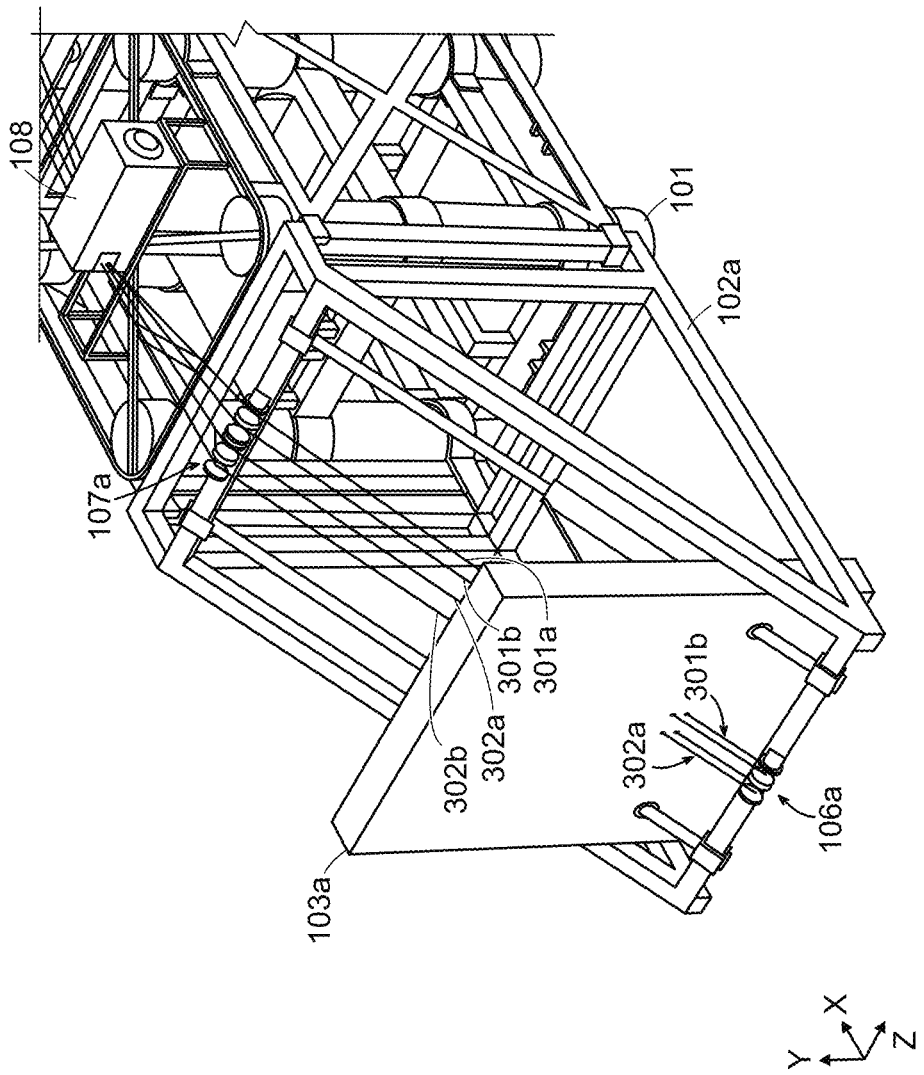
FIG. 8 illustrates the forward paddle in a lower position on the guide rails.

FIG. 7 illustrates the forward paddle 103a in an upper position on the forward guide rails 111a. When a wave exerts an upwards heave force on the forward paddle 103a, the upwards heave force accelerates the forward paddle 103a up the forward guide rails 111a. FIG. 8 illustrates the forward paddle 103a in a lower position on the guide rails 111a. When the wave exerts a downward heave force on the forward paddle 103a, the downward heave force accelerates the forward paddle 103a down the forward guide rails 111a. The aft paddle 103b moves up and down the aft guide rails 111b in the same manner as the forward paddle 103a.

Figure 9:
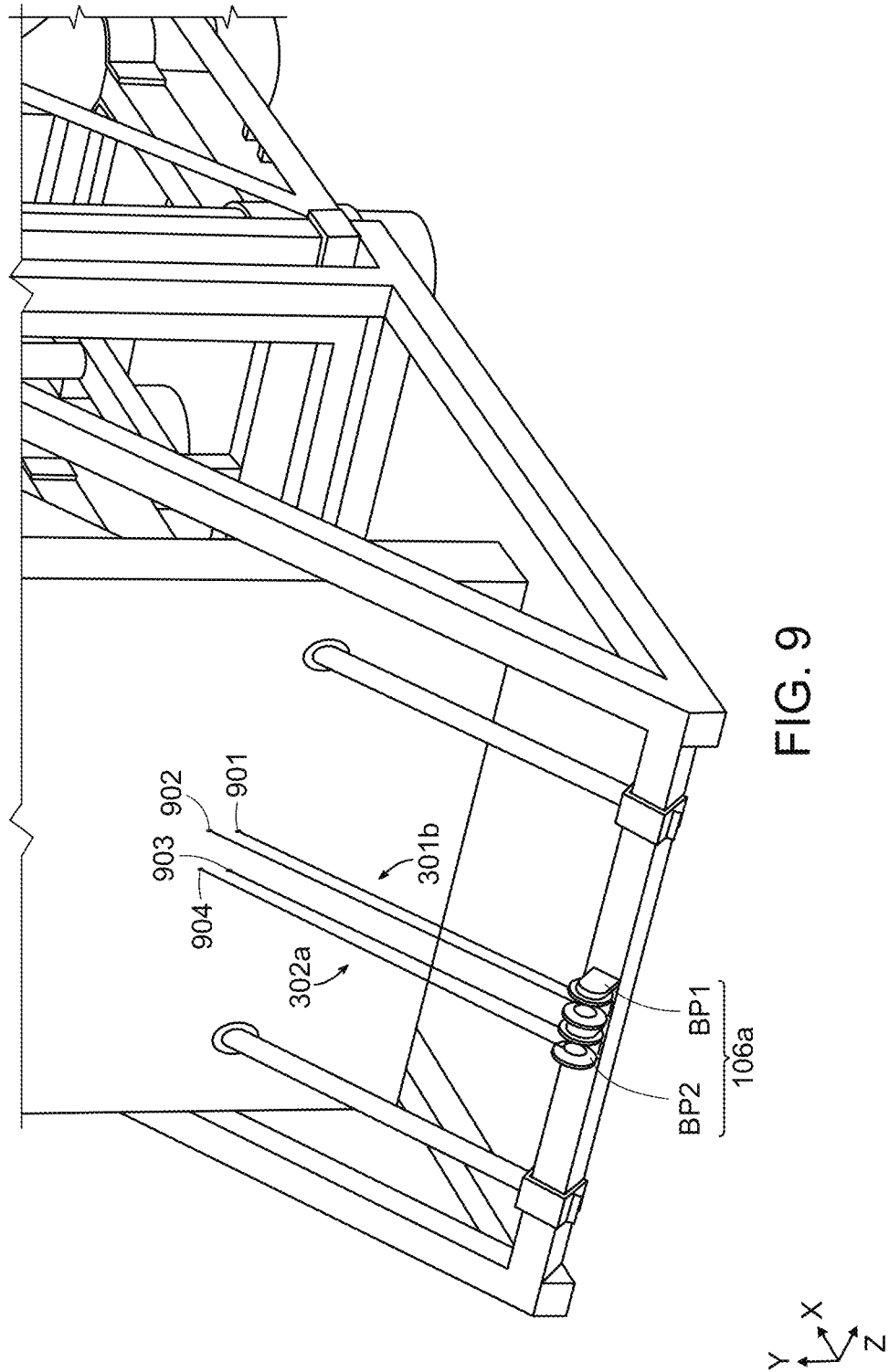
FIG. 9 illustrates a close-up view of the forward bottom pulleys.
Figure 10:
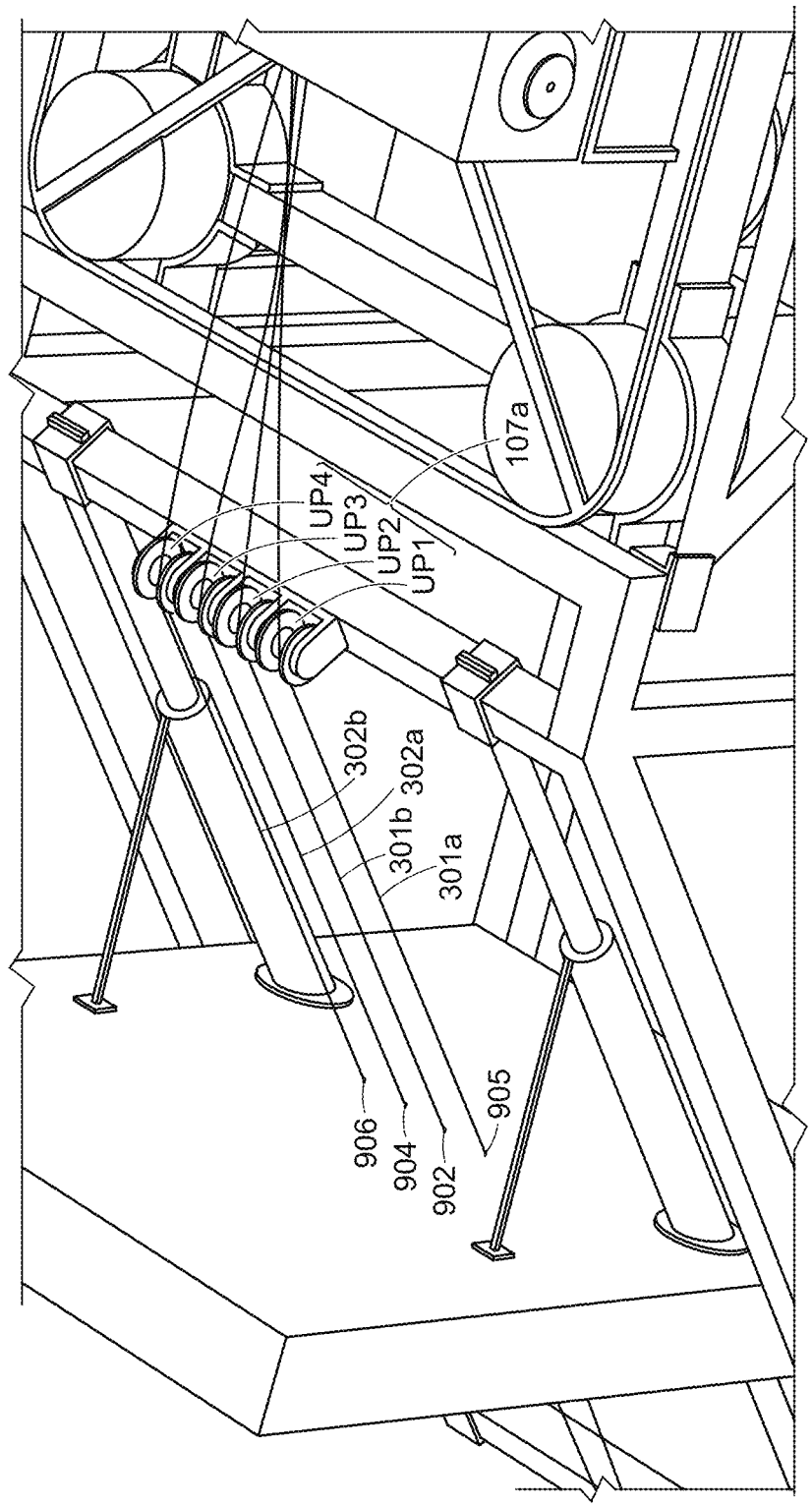
FIG. 10 illustrates a close-up view of the forward upper pulleys.
Figure 11:
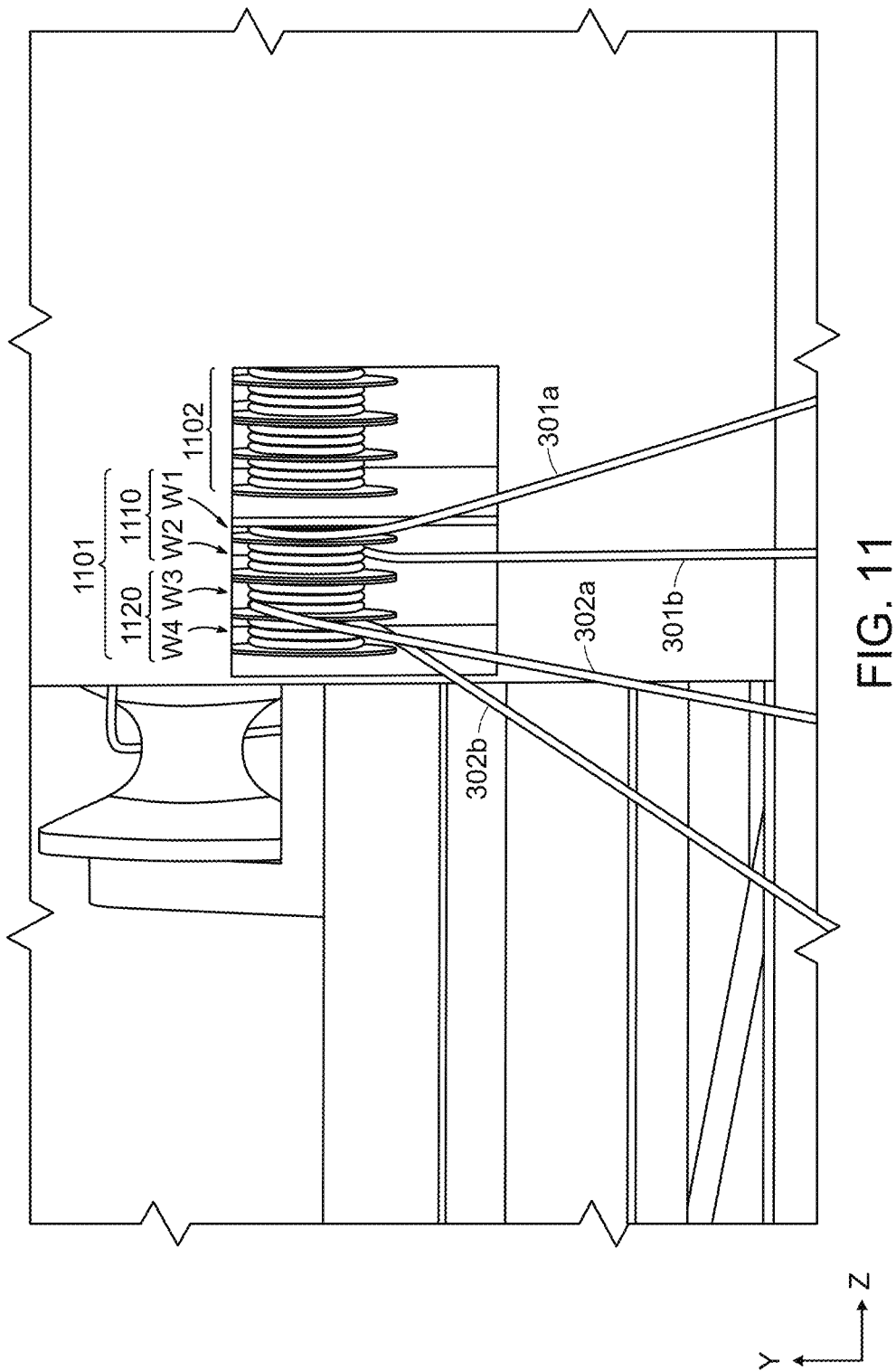
FIG. 11 illustrates a close-up view of the winches of the power take-off system.
Figure 14A:
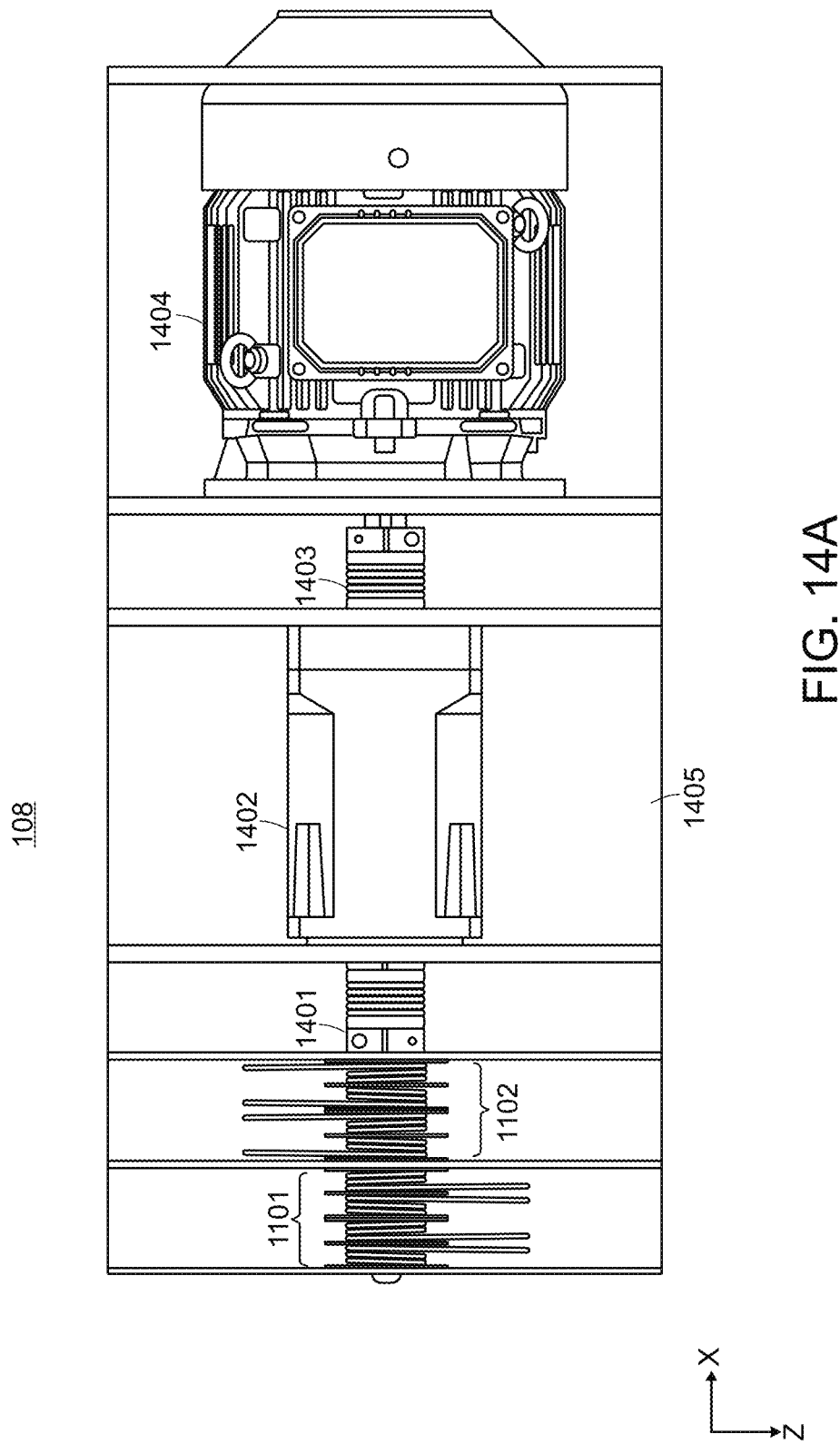
FIGS. 14A-B, 15, and 16 illustrate a top view, a front view, and a back view of the power take-off system, respectively.
Figure 14B:
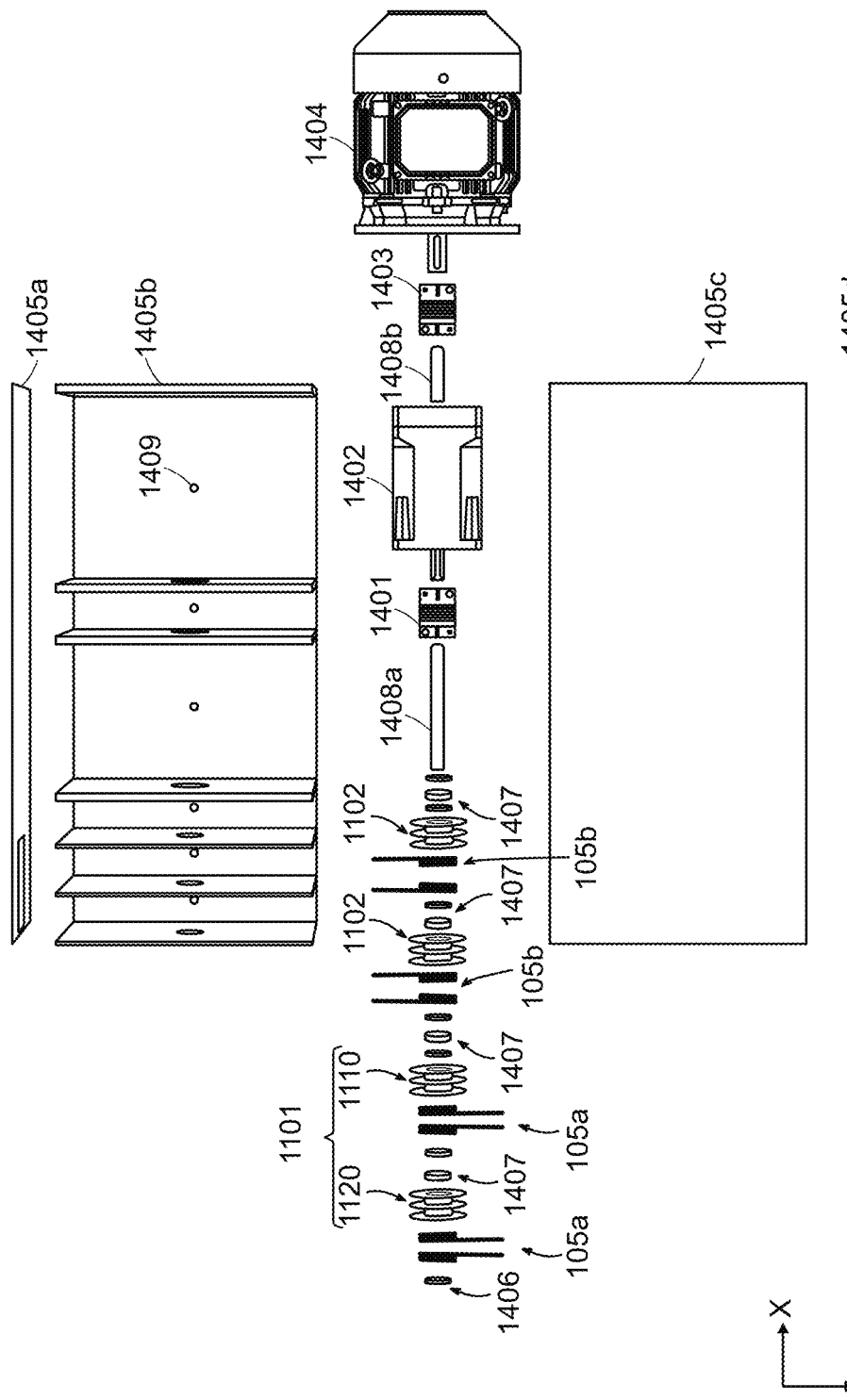
Figure 15:
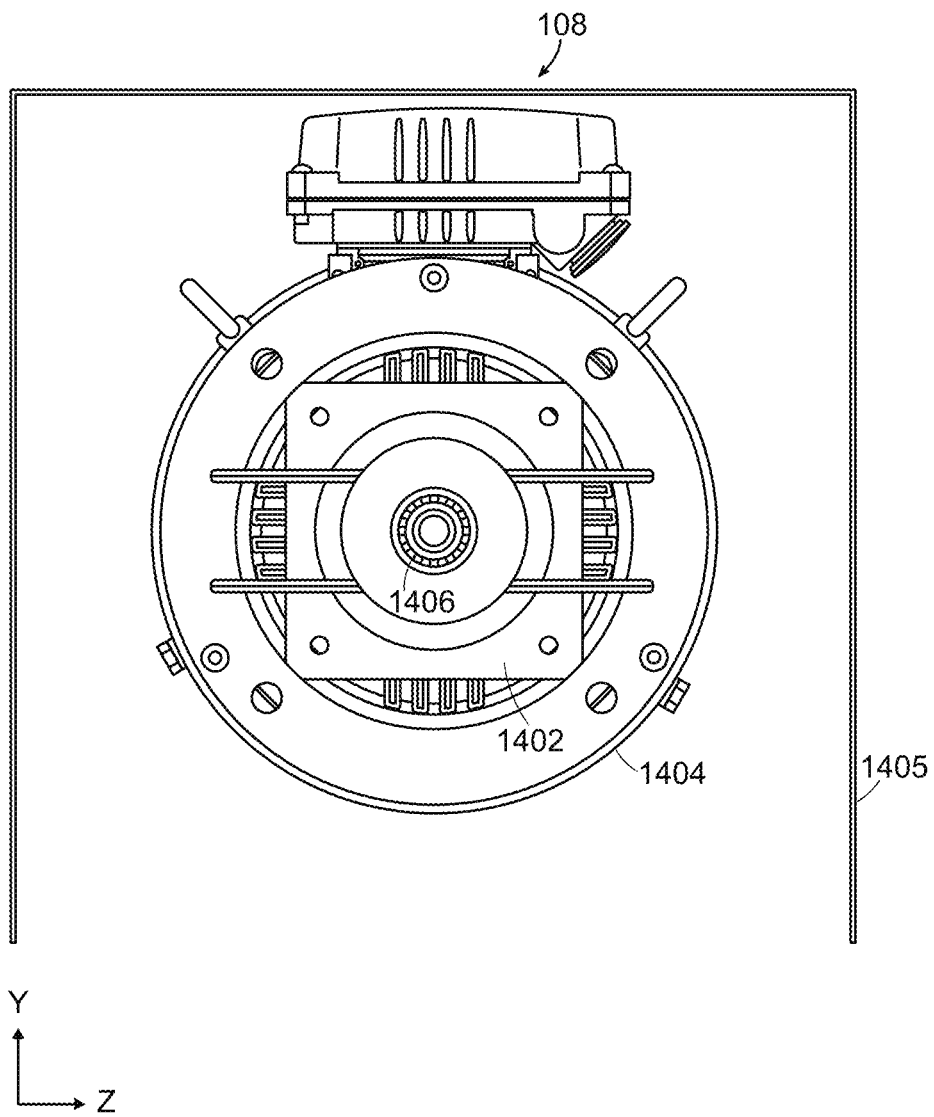
Figure 16:
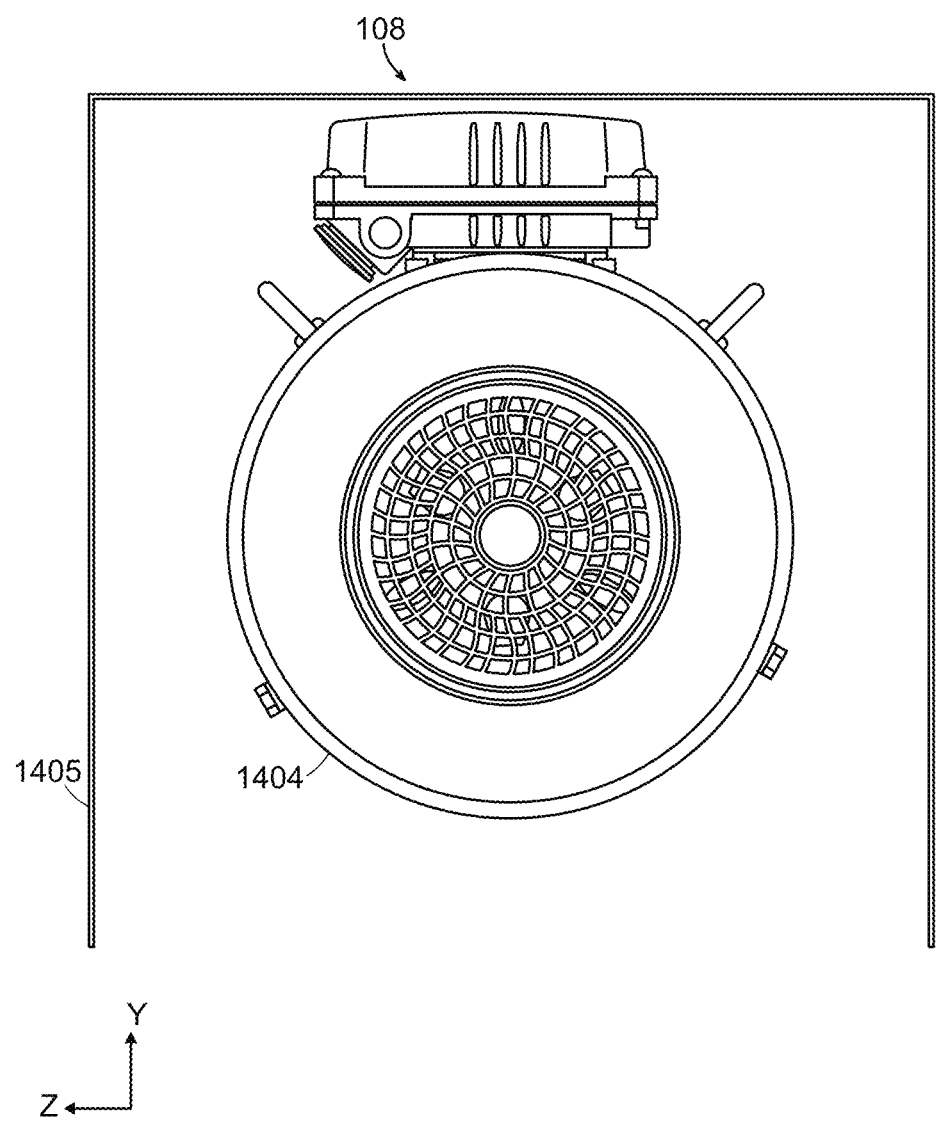

FIG. 9 illustrates a close-up view of the forward bottom pulleys 106a. As illustrated in FIG. 9, the forward bottom pulleys 106a include a first bottom pulley (BP1) and a second bottom pulley (BP2). FIG. 10 illustrates a close-up view of the upper pulleys 107a. As illustrated in FIG. 10, the upper pulleys 107a include a first upper pulley (UP1), a second upper pulley (UP2), a third upper pulley (UP3), and a fourth upper pulley (UP4). FIG. 11 illustrates a close-up view of the winches 1101-1102 of the power take-off system 108. As illustrated in FIG. 11, a first set of winches 1101 includes a first winch 1110 and a second winch 1120. The first winch 1110 includes a first winch portion W1 and a second winch portion W2. The second winch 1120 includes a first winch portion (W3) and a second winch portion (W4). The winch portions W1 and W2 are fixably attached to each other. The winch portions W3 and W4 are fixably attached to each other. The driving tether 301a is coupled to winch portion W1 and wraps around winch portion W1 in a first direction. The retrieval tether 301b is coupled to winch portion W2 and wraps around winch portion W2 in a second direction. The driving tether 302a is coupled to winch portion W3 and wraps around winch portion W3 in the first direction. The retrieval tether 302b is coupled to winch portion W4 and wraps around winch portion W4 in the second direction. The winch 1110 is coupled to a shaft 1408a (see FIG. 14B) in the power take-off system 108 via a one-way clutch 1407 (see FIG. 14B). The winch 1120 is coupled to the shaft 1408a in the power take-off system 108 via another one-way clutch 1407. The one-way clutches 1407 are configured to allow the shaft 1408a to rotate in the first direction, but not the second direction. Thus, a "one-way clutch," as used herein, refers to any mechanism which would allow the shaft to rotate in one direction but not the opposite direction. When the winch 1110 or 1120 is turned in the first direction due to movement of any combination of the tethers 301a-301b, 302a-302b, the one-way clutch 1407 between the winch 1110 or winch 1120 and the shaft 1408a is engaged, and the shaft 1408a is turned in the first direction. The rotation of the shaft 1408a causes the generator 1404 of the power take-off system 108 (see FIGS. 14A-14B) to rotate and generate electricity. However, when either the winch 1110 or the winch 1120 is turned in the second direction due to movement of any combination of the tethers 301a-301b, 302a-302b, the one-way clutch 1407 between the winch 1110 or the winch 1120 and the shaft 1408a is disengaged, and the shaft 1408a does not turn.

Referring to FIGS. 9, 10, 11, and 12, the retrieval tether 301b of the first forward set is coupled to an outer face of the forward paddle 103a at location 901. The retrieval tether 301b engages the bottom pulley BP1, traverses the bottom pulley BP1, and continues to traverse through the forward paddle 103a through a port 902. On the inside face of the forward paddle 103a, the retrieval tether 301b exits the port 902, engages and traverses the upper pulley UP2, and couples to winch portion W2.

The driving tether 301a of the first forward set is coupled to an inside face of the forward paddle 103a at location 905. The driving tether 301a engages and traverses the upper pulley UP1 and continues to couple to winch portion W1.

The driving tether 302a of the second forward set is coupled to an outer face of the forward paddle 103a at location 903. The driving tether 302a engages and traverses the bottom pulley BP2 and continues to traverse through the forward paddle 103a through a port 904. On the inside face of the forward paddle 103a, the driving tether 302a exits the port 904, engages and traverses the upper pulley UP3, and couples to winch portion W3.

The retrieval tether 302b of the second forward set is coupled to an inside face of the forward paddle 103a at location 906. The retrieval tether 302b engages and traverses the upper pulley UP4 and continues to couple to winch portion W4.

The first and second sets of aft tethers 311a-311b and 312a-312b engages the aft lower pulleys 106b, the aft upper pulleys 107b, and the winches 1102 in the same manner.

Figure 12:
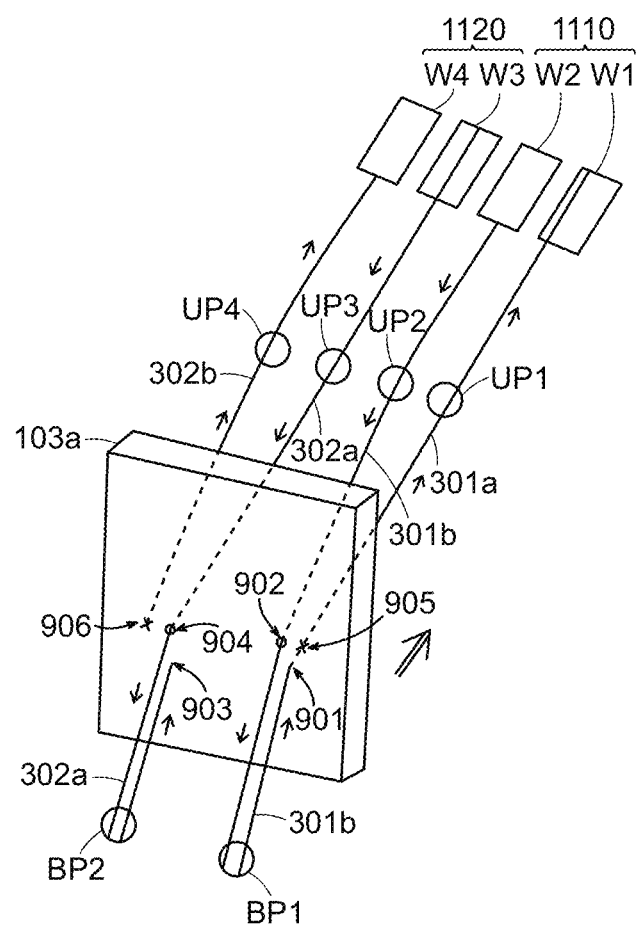
FIG. 12 is a block diagram illustrating the movement of the tethers when the forward paddle moves up the forward guide rails.
Figure 13:
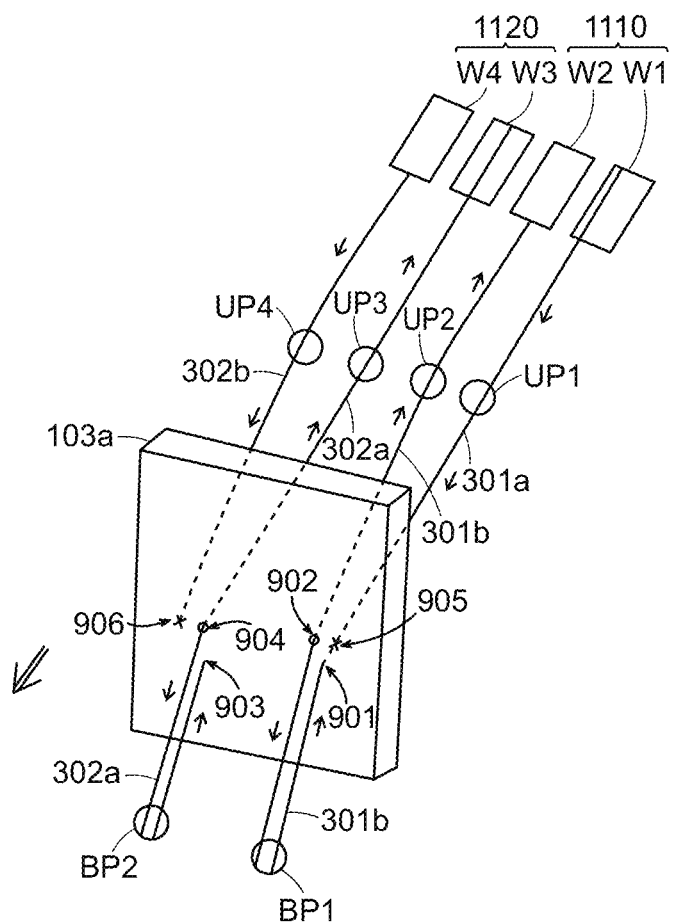
FIG. 13 is a block diagram illustrating the movement of the tethers when the forward paddle moves down the forward guide rails.

FIG. 12 is a block diagram illustrating the movement of the tethers 105a when the forward paddle 103a moves up the forward guide rails 111a. FIG. 13 is a block diagram illustrating the movement of the tethers 105a when the forward paddle 103a moves down the forward guide rails 111a. For illustrative purposes, only the forward paddle 103a, the forward tethers (301a-301b, 302a-302b), the forward pulleys (BP1-BP2, UP1-UP4), and the winches 1110, 1120 are shown. Referring to FIG. 12, when the forward paddle 103a moves up the forward guide rails 111a, the portion of the driving tether 302a coupled between the forward paddle 103a at location 903 and the bottom pulley BP2 is pulled upward. This causes the portion of the driving tether 302a coupled between the bottom pulley BP2 and the upper pulley UP3 to move downward, causing the driving tether 302a to unwind from the winch portion W3, and causing the winch portion W3 to rotate in the first direction. This in turn engages the one-way clutch 1407, which is between the winch 1120 and the shaft 1408a and causes the shaft 1408a to rotate in the first direction, resulting in the generation of power. The rotation of winch portion W3 in the first direction also rotates the winch portion W4 in the first direction, since winch portions W3 and W4 are fixably attached to each other, causing the retrieval tether 302b to wind onto the winch portion W4. The movement up the forward guide rails 111a also causes the retrieval tether 301b coupled between the forward paddle 103a at location 901 and the bottom pulley BP1 to be pulled upward. This causes the portion of the retrieval tether 301b coupled between the bottom pulley BP1 and the upper pulley UP2 to move downward, causing the retrieval tether 301b to unwind from the winch portion W2, and causing the winch portion W2 to rotate in the second direction. The rotation of winch portion W2 in the second direction also rotates the winch portion W1 in the second direction, since winch portions W2 and W1 are fixably attached to each other, causing the driving tether 301a to wind onto the winch portion W1. The rotation of the winch portion W2 in the second direction disengages the one-way clutch 1407 coupled between the winch 1110 and the shaft 1408a, and the shaft 1408a does not rotate.

Referring to FIG. 13, when the forward paddle 103a moves down the forward guide rails 111a, the portion of the driving tether 301a coupled between the forward paddle 103a at location 905 and the winch portion W1 is pulled downward, causing the winch portion W1 to rotate in the first direction. This in turn engages the one-way clutch 1407 coupled between the winch 1110 and the shaft 1408a and causes the shaft 1408a to rotate in the first direction, resulting in the generation of power. The rotation of winch portion W1 in the first direction also rotates the winch portion W2 in the first direction, since winch portions W1 and W2 are fixably attached to each other, causing the retrieval tether 301b to wind onto the winch portion W2. The movement down the forward guide rails 111a also causes the retrieval tether 302b coupled between the forward paddle 103a at location 906 and the winch portion W4 is pulled downward, causing the retrieval tether 302b to unwind from the winch portion W4, and causing the winch portion W4 to rotate in the second direction. The rotation of winch portion W4 in the second direction also rotates the winch portion W3 in the second direction, since winch portions W3 and W4 are fixably attached to each other, causing the driving tether 302a to wind onto the winch portion W3. The rotation of winch portion W4 in the second direction disengages the one-way clutch 1407 coupled between the winch 1120 and the shaft 1408a, and the shaft 1408a does not rotate.

Thus, when the forward paddle 103a moves up the forward guide rails 111a, the second set of forward tethers 302a-302b results in the generation of power. When the forward paddle 103a moves down the forward guide rails 111a, the first set of forward tethers 301a-301b results in the generation of power. In this manner, the WEC generates power with both up and down movements of the forward paddle 103a.

The movements of the aft paddle 103b and the first and second set of aft tethers 311a-311b, 312a-312b result in the generation of power in the same manner as described above with the forward paddle 103a.

FIGS. 14A-B, 15, and 16 illustrate a top view, a front view, and a back view of the power take-off system, respectively. The power take-off system 108 includes a first set of winches 1101 and a second set of winches 1102. The first set of winches 1101 engage the forward tethers 105a, and the second set of winches 1102 engage the aft tethers 105b. Traversing through the length of the power take-off system 108 are shafts 1408a-1408b. Coupled to the first shaft 1408a is a set of ball bearings 1406 and one-way clutches 1407. The ball bearings 1406 can rotate in either direction and acts as a connection point between the first shaft 1408a and the housing 1405 and between the first shaft 1408a and the winches 1101-1102. The one-way clutches 1407 engage with the first shaft 1408a in the first direction and disengage from the first shaft 1408a in the second direction, which is opposite the first direction. The one-way clutches 1407 reside between the first shaft 1408a and winches 1101-1102. There is one one-way clutch 1407 within the winch 1110 and another one-way clutch 1407 within the winch 1120. The first shaft 1408a is coupled to a gearbox 1402 via a first shaft coupler 1401. The second shaft 1408b is coupled to the gearbox 1402 via a keyway connection and to a generator 1404 via a second shaft coupler 1403. The components of the power take-off system 108 resides within a housing 1405 that includes a first side cover 1405a, a base plate 1405b, a top cover 1405c, and a second side cover 1405d. The base plate 1405b includes a plurality of drainage holes 1409 to drain any seawater that enters the housing 1405.

The total water-related force on each paddle 103a-103b are composed of hydrostatic force, hydrodynamic force, and viscous force. The hydrostatic force provides restoring force on the paddles 103a-103b to their initial equilibrium position. The hydrodynamic force provides excitation force, and the viscous force provides damping to the paddle motion. When waves approach the forward and then aft paddles 103a-103b, the hydrodynamic force, which is a combination of both heave and surge forces, moves the paddles 103a-103b on their respective guide rails 111a-111b. FIGS. 17A-17C illustrates the wave-paddle interaction for the modular wave energy converter. The heave force references up and down force (z-direction) while the surge force references left and right force (x-direction). FIG. 17A illustrates the motion of the wave as the wave travels. FIG. 17B illustrates the force exerted on the forward paddle 103a by the wave. FIG. 17C illustrates the force exerted on the aft paddle 103b by the wave. Note that the diagrams do not fully account of the feed buoy 101 itself. As the wave approaches at point 1, the wave exerts an upwards heave force on the forward paddle 103a, causing the forward paddle 103a to accelerate up the forward guide rails 111a, as depicted by the solid semi-circle in FIG. 17B. Between points 1 and 2, the forward paddle 103A experiences a combination of an upwards heave force and a surge force towards the aft. During this phase, the forward paddle 103a undergoes its maximum linear acceleration of the cycle up the forward guide rails 111a. At point 2, the wave exerts a surge force towards the aft on the forward paddle 103a and continues to cause the forward paddle 103a to accelerate up the forward guide rails 111a. Between points 2 and 3, the forward paddle 103a experiences a combination of a downwards heave force and a surge force towards the aft. During this phase, the forward paddle 103a undergoes a point where the acceleration is zero, since the surge and heave forces cancel each other out. This phase also marks the transition from accelerating up to accelerating down the forward guide rails 111a. At point 3, the wave exerts a downwards heave force on the forward paddle 103a, causing the forward paddle 103a to continue to accelerate down the forward guide rails 111a. The phase in which the forward paddle 103a experiences an acceleration down the forward guide rails 111a is depicted by the dotted semi-circle in FIG. 17B. Between points 3 and 4, the forward paddle 103a experiences a combination of a downwards heave force and a surge force towards the forward. During this phase, the forward paddle 103a undergoes its maximum linear acceleration of the cycle down the forward guide rails 111a. At point 4, the wave exerts a surge force towards the forward on the forward paddle 103a, causing the forward paddle 103a to continue to accelerate down the forward guide rail 111a. The cycle ends between points 4 and 1, as the forward paddle 103a experiences a combination of an upwards heave force and a surge force towards the forward. During this phase, the forward paddle 103a undergoes a point where the acceleration is zero on the forward paddle 103a as the surge and heave forces cancel each other out. Then the cycle starts anew at point 1.

The wave-paddle interaction on the aft paddle 103b is the similar to the wave-paddle interaction on the forward paddle 103a but phase shifted, as illustrated in FIG. 17C. Illustrated in FIG. 17C is the phase between points 1 and 2, in which the aft paddle 103b experiences a point of zero acceleration instead of maximum acceleration. When the surge force is towards the aft, it opposes the upwards heave force, causing the two to cancel out.

The forward and aft paddles 103a-103b enables the WEC to resonate with the incident waves, even with a small scale, e.g., 4 meters wide. The WEC harvests the wave energy in both heave and surge directions, allowing for an improved capture width ratio. By adjusting the underwater length and thickness of the forward and aft paddles 103a-103b, the WEC's natural period can be tuned to any desired peak wave periods in the ocean. The WEC may be moored close to the coastline, where waves travel in one direction, and aligned with the direction of travel for the waves in order to maximize the power conversion. The symmetrical design of the WEC, with forward and aft paddles 103a-103b assist in maximizing the power conversation and also provides a load balanced structure. With the forward and aft paddles 103a-103b oriented in vertical positions, their respective movements along the forward and aft guide rails 111a-111b are also maximized, in turn further assisting in maximizing the power conversion. By using the tether-and-winch system to drive the generator and converting the dual-directional motions of the forward and aft paddles 103a-103b into uni-directional motion of the power generator, the modular wave energy converter can achieve a higher power conversion efficiency as compared to conventional wave energy converters at a similar. The WEC is further configured to attach onto existing floating and fixed infrastructure, such as the feed buoy 101, which allows the WEC to be implemented at a lower capital cost. By leveraging existing infrastructure, costs associated with surveying, permitting, environmental monitoring, and mooring and anchor installation are removed. Further, costs associated with installation and maintenance that requires underwater vehicles and divers are also reduced, as only the bottom portion of the paddles 103a-103b and attachment frames 102a-102b are submerged while being close to the surface of the water. Line A in FIG. 1 illustrates an approximate water line. The power take-off system 108 remains above the waterline A, making maintenance simpler and at a lower cost.

Although the WEC is described above with the paddle and its corresponding components at both the forward and aft sides, a paddle and corresponding components may be implemented at only the forward side or only at the aft side.

Figure 23:
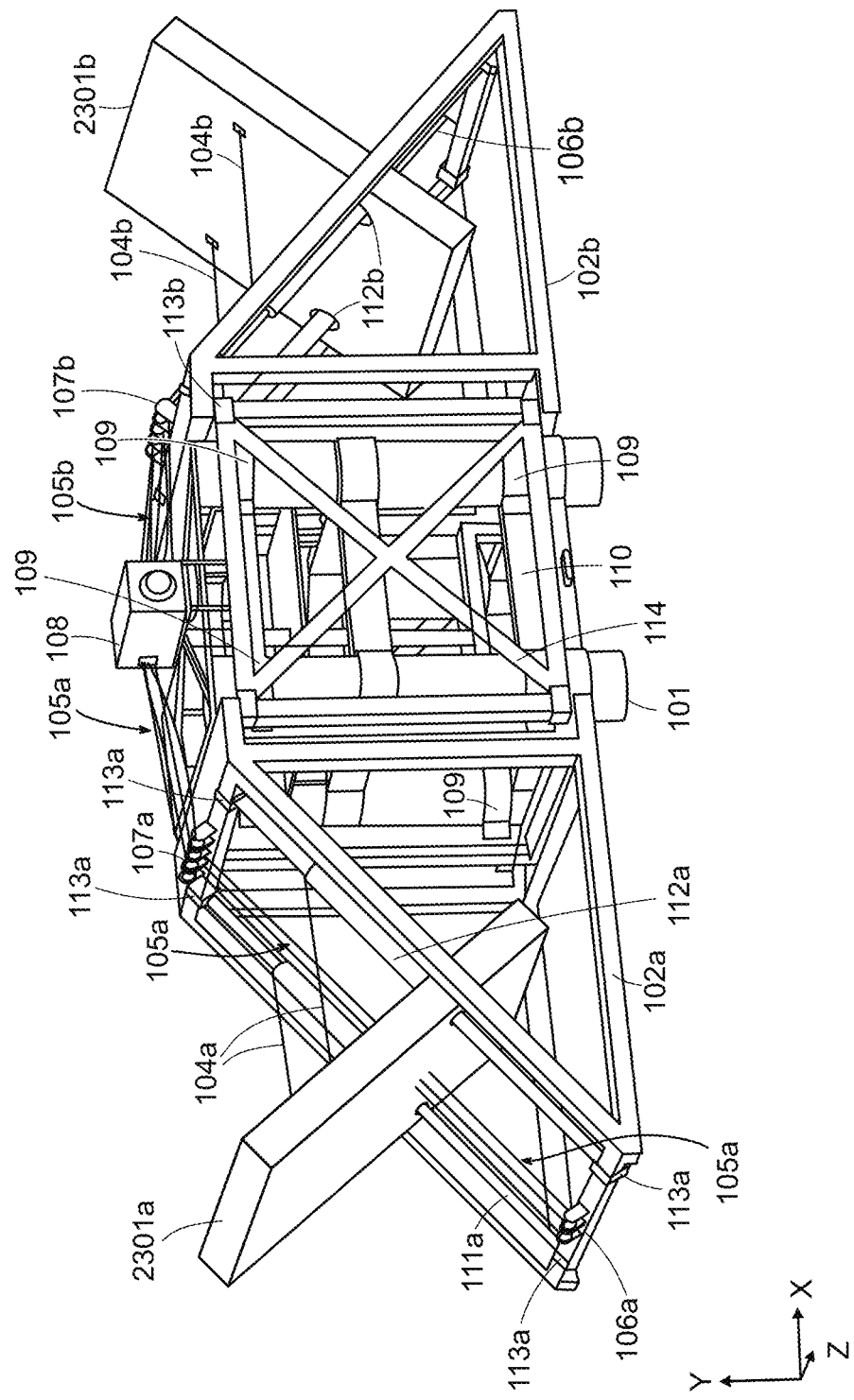
FIG. 23 illustrates a perspective view of a first alternative embodiment of the modular wave energy converter.

FIG. 23 illustrates a perspective view of a first alternative embodiment of the modular wave energy converter. In this embodiment, the forward paddle 2301a and the aft paddle 2301b are inclined instead of being positioned vertically. The other components of the first alternative embodiment are the same as the embodiment illustrated above and generates power through both the upward and downward movements of the paddles 2103a-2103b, as described above.

Figure 18:
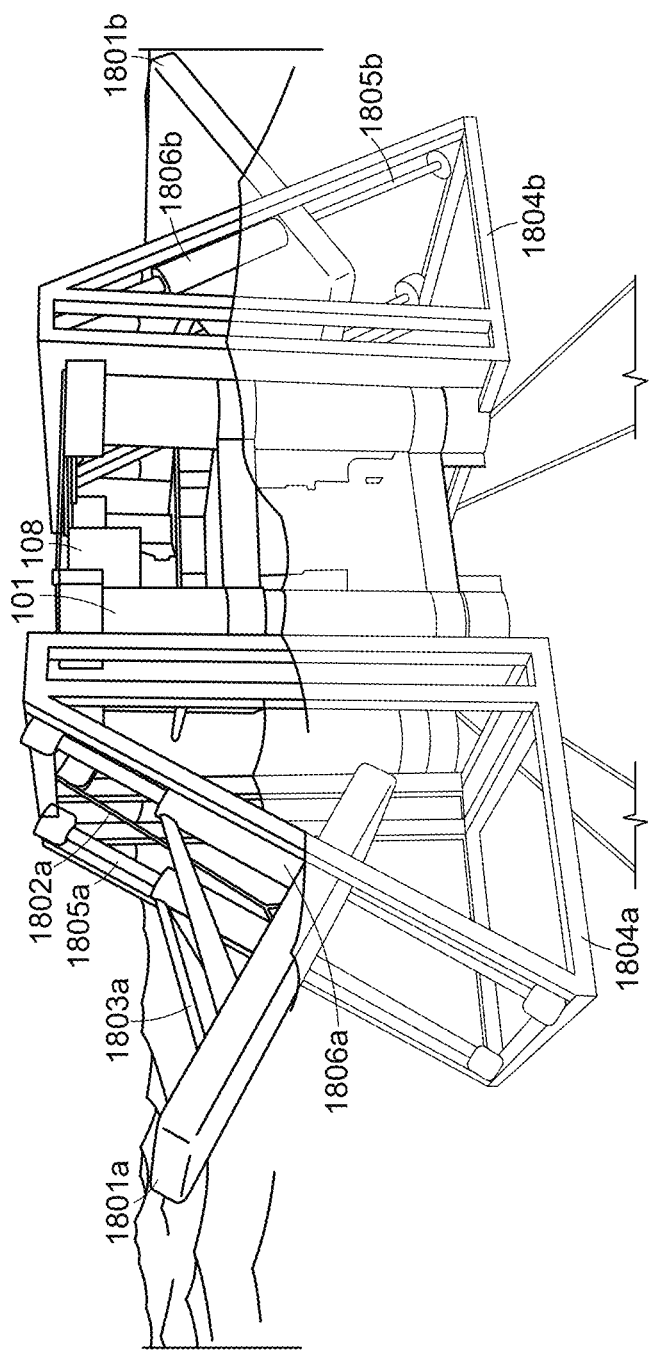
FIGS. 18, 19, and 20 illustrate a perspective view, a side view, and a top view, respectively, of a second alternative embodiment of the modular wave energy converter.
Figure 19:
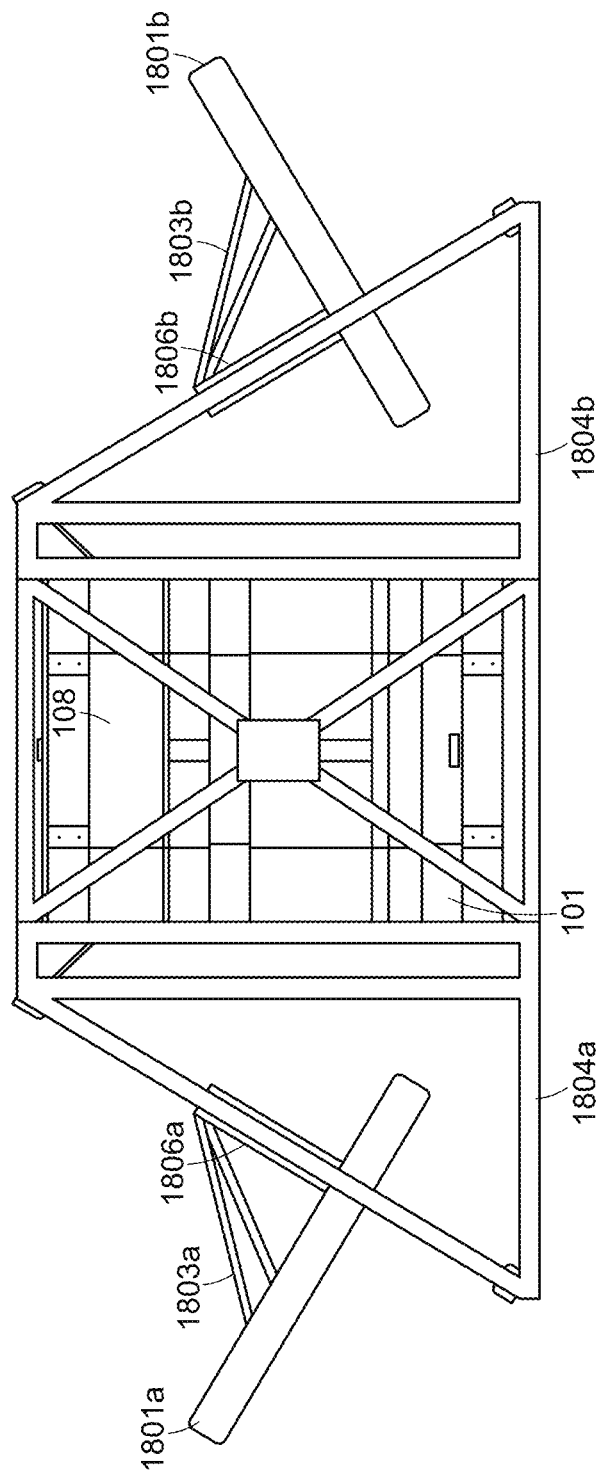
Figure 20:
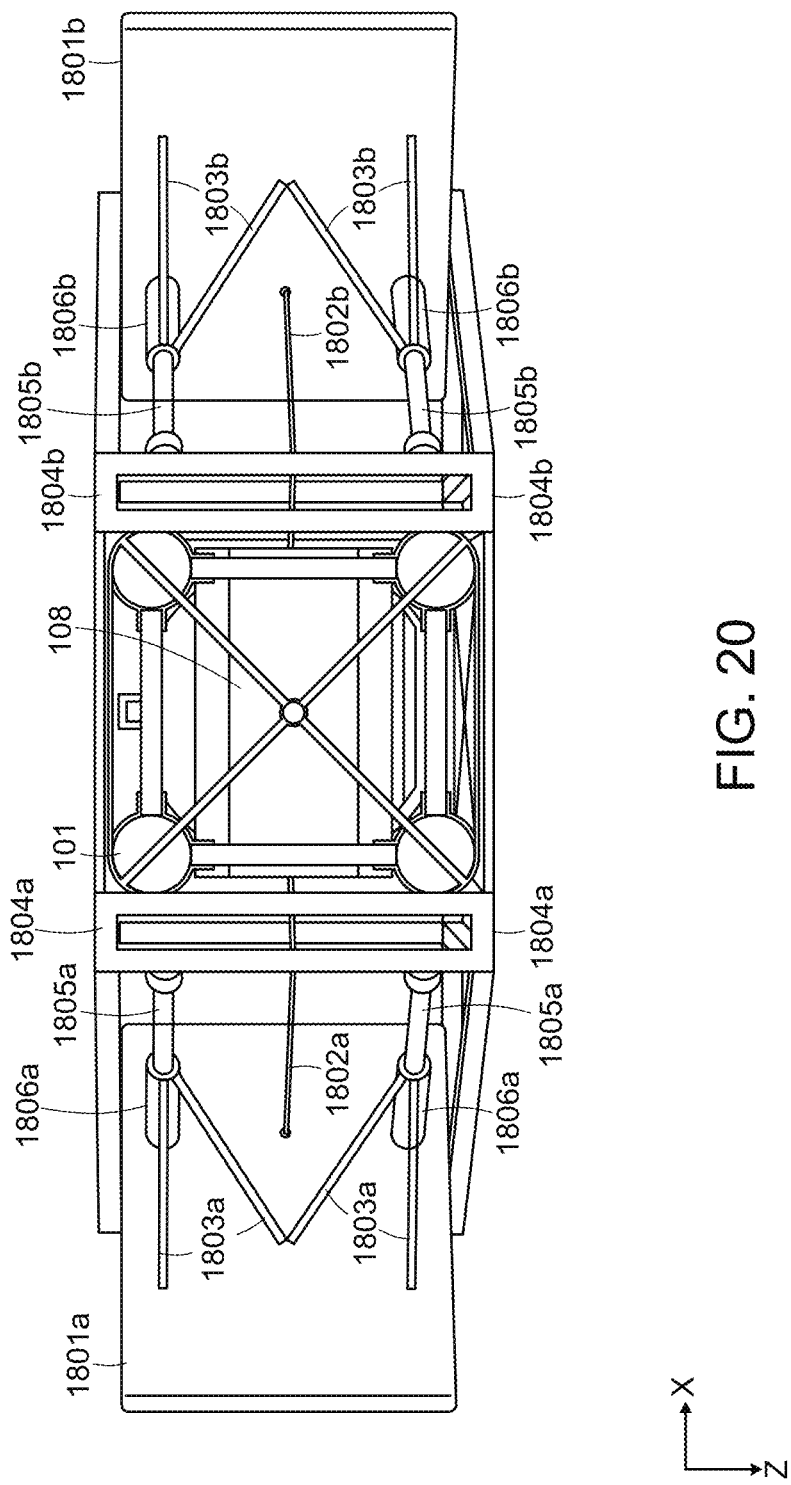

FIGS. 18, 19, and 20 illustrate a perspective view, a side view, and a top view, respectively, of a second alternative embodiment of the modular wave energy converter. In the alternative embodiment, the forward paddle 1801a and the aft paddle 1801b are inclined. The forward paddle 1801a is coupled to the forward attachment frame 1804a via inclined forward guide rails 1805a. At the interface between the forward paddle 1801a and the forward guide rails 1805a are forward sleeves 1806a. The forward support trusses 1803a are coupled to the forward paddle 1801a on one end and coupled to the forward sleeves 1806a on the other end. One end of a forward tether 1802a is coupled to an inside face of the forward paddle 1801a, and the other end of the forward tether 1802a is coupled to a winch (not shown) of the power take-off system 108. The forward paddle 1801a moves up and down the forward guide rails 1805a. Similarly, the aft paddle 1801b is coupled to the aft attachment frame 1804b via inclined aft guide rails 1805b. At the interface between the aft paddle 1801b and the aft guide rails 1805b are aft sleeves 1806b. The aft support trusses 1803b are coupled to the aft paddle 1801b on one end and coupled to the aft sleeves 1806a on the other end. One end of an aft tether 1802b is coupled to an inside face of the aft paddle 1801b, and the other end of the aft tether 1802b is coupled to the power take-off system 108. The aft paddle 1801b moves up and down the aft guide rails 1805b. In the alternative embodiment, the WEC interfaces with the waves and generates power in a similar manner as described above with reference to FIGS. 17A-17C. In the alternative embodiment, since the paddles 1801a-1801b are inclined, their movements up and down the guide rails 1805a-1805b have lesser ranges than the vertically positioned paddles 103a-103b.

Figure 21:
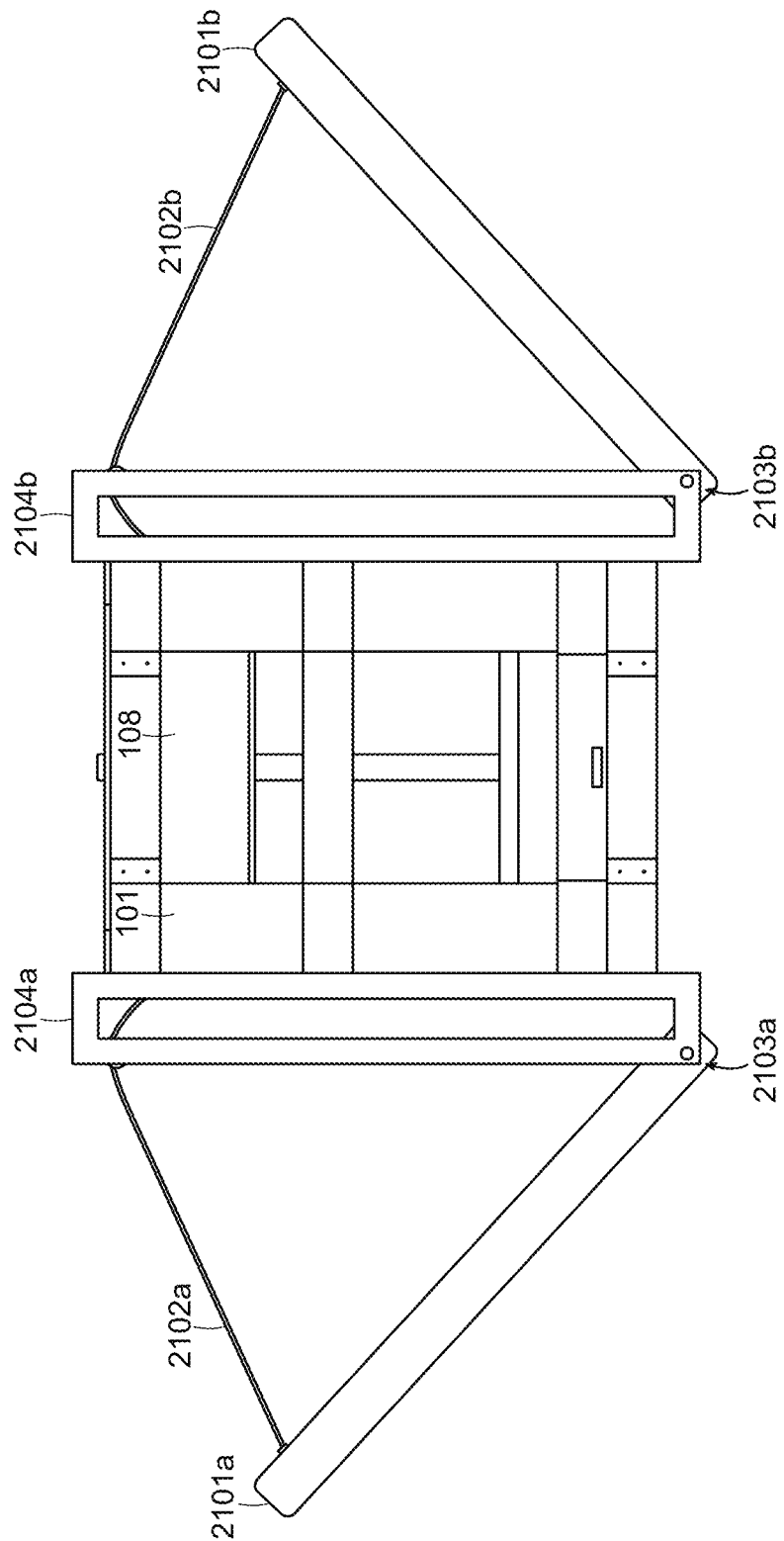
FIGS. 21 and 22 illustrate a side view and a top view, respectively, of a third alternative embodiment of the modular wave energy converter.
Figure 22:
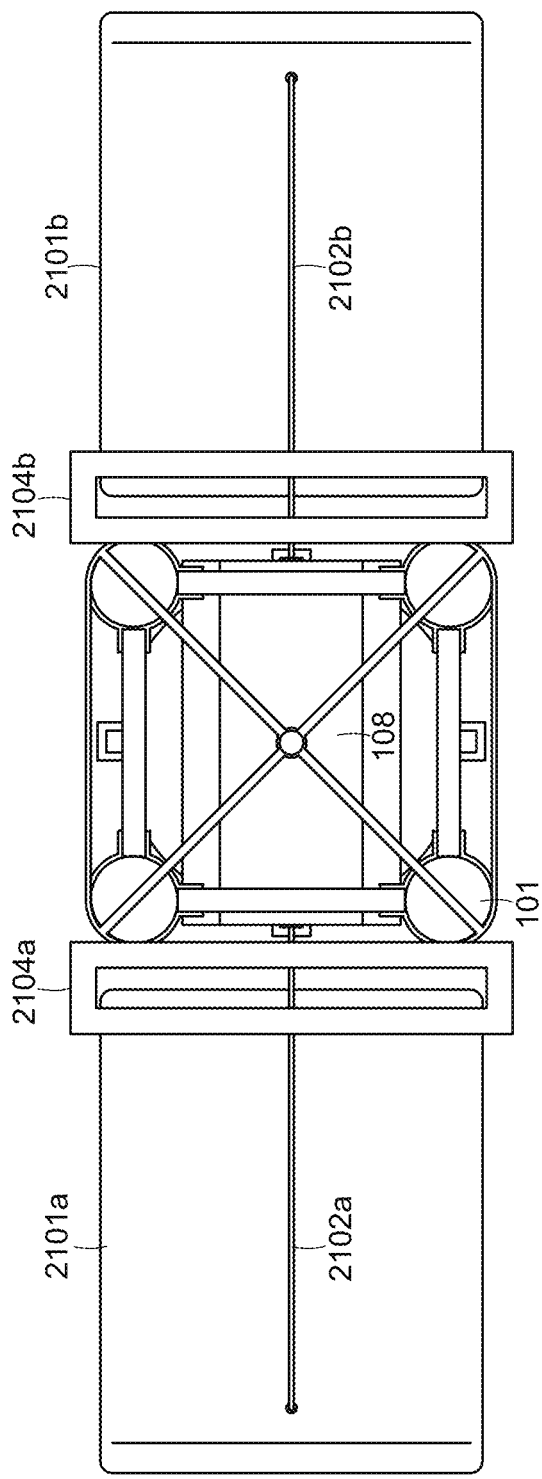

FIGS. 21 and 22 illustrate a side view and a top view, respectively, of a third alternative embodiment of the modular wave energy converter. In the second alternative embodiment, the forward paddle 2101a and the aft paddle 2101b are flap-type paddles. The forward paddle 2101a is coupled to the forward attachment frame 2104a via a forward hinge 2103a. One end of a forward tether 2102a is coupled to an inside face of the forward paddle 2101a, and the other end of the forward tether 2102a is coupled to the power take-off system 108. The forward paddle 2101a pivots about the hinge 2103a. Similarly, the aft paddle 2101b is coupled to the aft attachment frame 2104b via an aft hinge 2103b. One end of an aft tether 2102b is coupled to an inside face of the aft paddle 2101b, and the other end of the aft tether 2102b is coupled to the power take-off system 108.

In the third alternative embodiment, the WEC interfaces with the waves and generates power in a similar manner as described above in that, when the forward and aft tethers 2101a-2101b are pulled, this rotates a winch (not shown) in the power take-off system 108, which in turns drives the power generator of the power take-off system 108. In resonance, the forward and aft paddles 2101a-2101b pivot upwards while the feed buoy 101 moves down. The forward and aft paddles 2101a-2101b pivot downwards while the feed buoy 101 moves up. With reference to FIGS. 17A-17C, when the wave approaches at point 1, the wave exerts an upwards pitch force on the forward paddle 2101a, causing the forward paddle 2101a to experience acceleration upwards and towards the feed buoy 101, as depicted by the solid semi-circle in FIG. 17B. Between points 2 and 3, the forward paddle 2101a reaches a maximum angular acceleration of the cycle, pivoting towards the feed buoy 101. At point 2, the wave continues to exert a pitch force on the forward paddle 2101a and continues to cause the forward paddle 2101a to pivot towards the feed buoy 101. Between steps 2 and 3, the forward paddle 2101a transitions from a pitch force that is upwards and towards the feed buoy 101 to a pitch force that is downwards and away from the feed buoy 101. The angular acceleration reaches zero during this phase. At point 3, the wave exerts a downwards pitch force, causing the forward paddle 2101a to pivot away from the feed buoy 101, as depicted by the dotted semi-circle in FIG. 17B. Between points 3 and 4, the forward paddle 2101a reaches maximum angular acceleration of the cycle, downwards and away from the feed buoy 101. At point 4, the wave continues to exert a pitch force on the forward paddle 2101a and continues to cause the forward paddle 2101a to pivot away from the feed buoy 101. The cycles end between steps 4 and 1 as the forward paddle 2101a transitions from a pitch force that is downwards and away from the feed buoy 101 to a pitch force that is upwards and towards the feed buoy 101. The angular acceleration reaches zero during this phase. Then the cycle starts anew at point 1.

The forces on the aft paddle 2101b are the same as the forward paddle 2101a but phase shifted, as illustrated in FIG. 17C. Illustrated in FIG. 17C is the phase between points 1 and 2, in which the aft paddle 2101b experiences a point of zero acceleration instead of maximum acceleration. When the surge force is towards the aft, it opposes the upwards heave force, causing the two to cancel out.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A modular wave energy converter, comprising:
   a power take-off system, the power take-off system comprising a shaft, the shaft being coupled to a generator;
   a forward attachment frame coupled to a forward side;
   an aft attachment frame coupled to an aft side;
   a plurality of forward guide rails coupled to the forward attachment frame;
   a plurality of aft guide rails coupled to the aft attachment frame;
   a forward paddle coupled to the forward guide rails and configured to move up and down the forward guide rails;
   an aft paddle coupled to the aft guide rails and configured to move up and down the aft guide rails;

one or more forward tethers coupled to the forward paddle and the shaft, wherein the one or more forward tethers comprises:
a driving tether of a first forward set,
a retrieval tether of the first forward set,
a driving tether of a second forward set, and
a retrieval tether of the second forward set,
one or more aft tethers coupled to the aft paddle and the shaft, wherein the one or more aft tethers comprises:
a driving tether of a first aft set,
a retrieval tether of the first aft set,
a driving tether of a second aft set, and
a retrieval tether of the second aft set,
wherein in response to a combination of heave and surge forces from waves of water, the forward paddle moves up and down the forward guide rails and the aft paddle moves up and down the aft guide rails,
wherein the movement of the forward paddle moves the one or more forward tethers and the movement of the aft paddle moves the one or more aft tethers,
wherein the movement of the one or more forward tethers and the movement of the one or more aft tethers cause the shaft to rotate.

2. The converter of claim 1, further comprising:
a first forward bottom pulley and a second forward bottom pulley coupled to a lower portion of the forward attachment frame;
a first forward upper pulley, a second forward upper pulley, a third forward upper pulley, and a fourth forward upper pulley coupled to an upper portion of the forward attachment frame; and
the power take-off system comprising a first winch and a second winch, the first winch comprising a first winch portion fixably coupled to a second winch portion, the second winch comprising a third winch portion fixably coupled to a fourth winch portion,
wherein the first winch and the second winch are coupled to a plurality of one-way clutches, wherein the one-way clutches are coupled to the shaft, wherein the shaft is configured to rotate in a first direction but not in a second direction.

3. The converter of claim 2, further comprising:
a first one-way clutch coupled to the first winch and the shaft, and
a second one-way clutch coupled to the second winch and the shaft,
wherein the first one-way clutch and the second one-way clutch are configured to allow the shaft to rotate in the first direction and not allow the shaft to rotate in the second direction.

4. The converter of claim 3, wherein the forward paddle comprises a first port and a second port,
wherein the driving tether of the first forward set is coupled to a first location on an inside face of the forward paddle, engages and traverses the first forward upper pulley, and couples to the first winch portion, wherein the driving tether of the first forward set is wound onto the first winch portion in a first winding direction,
wherein the retrieval tether of the first forward set is coupled to a second location on an outside face of the forward paddle, engages and traverses the first forward bottom pulley, traverses through the first port and exits the inside face of the forward paddle, engages and traverses the second forward upper pulley, and couples to the second winch portion, wherein the retrieval tether of the first forward set is wound onto the second winch portion in a second winding direction,
wherein the driving tether of the second forward set is coupled to a third location on the outside face of the forward paddle, engages and traverses the second forward bottom pulley, traverse through the second port and exits the inside face of the forward paddle, engages and traverse the third forward upper pulley, and couples to the third winch portion, wherein the driving tether of the second forward set is wound onto the third winch portion in the first winding direction,
wherein the retrieval tether of the second forward set is coupled to a fourth location on the inside face of the forward paddle, engages and traverses the fourth forward upper pulley, and couples to the fourth winch portion, wherein the retrieval tether of the second forward set is wound onto the fourth winch portion in the second winding direction.

5. The converter of claim 4, wherein when the forward paddle moves up the forward guide rails, the driving tether of the second forward set causes the third winch portion to rotate in the first winding direction,
wherein the rotation of the third winch portion in the first winding direction causes the shaft to rotate in the first direction of the shaft, wherein the rotation of the shaft in the first direction of the shaft generates electricity through the generator,
wherein the rotation of the third winch portion in the first winding direction causes the fourth winch portion to rotate in the first winding direction,
wherein the rotation of the fourth winch portion in the first winding direction causes the retrieval tether of the second forward set to wind onto the fourth winch portion,
wherein the retrieval tether of the first forward set causes the second winch portion to rotate in the second winding direction,
wherein the first one-way clutch prevents the rotation of the shaft when the second winch portion rotates in the second winding direction,
wherein the rotation of the second winch portion in the second winding direction causes the first winch portion to rotate in the second winding direction, and
the rotation of the first winch portion in the second winding direction causes the driving tether of the first forward set to wind onto the first winch portion.

6. The converter of claim 5, wherein when the forward paddle moves down the forward guide rails, the driving tether of the first forward set causes the first winch portion to rotate in the first winding direction,
wherein the rotation of the first winch portion in the first winding direction causes the shaft to rotate in the first direction of the shaft, wherein the rotation of the shaft in the first direction of the shaft generates electricity through the generator,
wherein the rotation of the first winch portion in the first winding direction causes the second winch portion to rotate in the first winding direction,
wherein the rotation of the second winch portion in the first winding direction causes the retrieval tether of the first forward set to wind onto the second winch portion,
wherein the retrieval tether of the second forward set causes the fourth winch portion to rotate in the second winding direction,
wherein the second one-way clutch prevents the rotation of the shaft when the fourth winch portion rotates in the second winding direction, wherein the rotation of the fourth winch portion in the second winding direction causes the third winch portion to rotate in the second winding direction, and wherein the rotation of the third winch portion in the second winding direction causes the driving tether of the second forward set to wind onto the third winch portion.

7. The converter of claim 1, further comprising:

a first aft bottom pulley and a second aft bottom pulley coupled to a lower portion of the aft attachment frame;

a first aft upper pulley, a second aft upper pulley, a third aft upper pulley, and a fourth aft upper pulley coupled to an upper portion of the aft attachment frame; and the power take-off system comprising a first aft winch and a second aft winch, the first aft winch comprising a first aft winch portion fixably coupled to a second aft winch portion, the second winch comprising a third aft winch portion fixably coupled to a fourth aft winch portion, wherein the first aft winch and the second aft winch are coupled to a plurality of one-way clutches, wherein the one-way clutches are coupled to the shaft, wherein the shaft is configured to rotate in a first direction but not in a second direction.

8. The converter of claim 7, further comprising:

a first aft one-way clutch coupled to the first aft winch and the shaft, and a second aft one-way clutch coupled to the second aft winch and the shaft, wherein the first aft one-way clutch and the second aft one-way clutch are configured to allow the shaft to rotate in the first direction and not allow the shaft to rotate in the second direction.

9. The converter of claim 8, wherein the aft paddle comprises a first aft port and a second aft port, wherein the driving tether of the first aft set is coupled to a first location on an inside face of the aft paddle, engages and traverses the first aft upper pulley, and couples to the first aft winch portion, wherein the driving tether of the first aft set is wound onto the first aft winch portion in a first winding direction, wherein the retrieval tether of the first aft set is coupled to a second location on an outside face of the aft paddle, engages and traverses the first aft bottom pulley, traverses through the first aft port and exits the inside face of the aft paddle, engages and traverses the second aft upper pulley, and couples to the second aft winch portion, wherein the retrieval tether of the first aft set is wound onto the second aft winch portion in a second winding direction, wherein the driving tether of the second aft set is coupled to a third location on the outside face of the aft paddle, engages and traverses the second aft bottom pulley, traverse through the second aft port and exits the inside face of the aft paddle, engages and traverse the third aft upper pulley, and couples to the third aft winch portion, wherein the driving tether of the second aft set is wound onto the third aft winch portion in the first winding direction, wherein the retrieval tether of the second aft set is coupled to a fourth location on the inside face of the aft paddle, engages and traverses a fourth aft upper pulley, and couples to the fourth aft winch portion, wherein the retrieval tether of the second aft set is wound onto the fourth aft winch portion in the second winding direction.

10. The converter of claim 9, wherein when the aft paddle moves up the aft guide rails, the driving tether of the second aft set causes the third aft winch portion to rotate in the first winding direction, wherein the rotation of the third aft winch portion in the first winding direction causes the shaft to rotate in the first direction of the shaft, wherein the rotation of the shaft in the first direction of the shaft generates electricity through the generator, wherein the rotation of the third aft winch portion in the first winding direction causes the fourth aft winch portion to rotate in the first winding direction, wherein the rotation of the fourth aft winch portion in the first winding direction causes the retrieval tether of the second aft set to wind onto the fourth aft winch portion, wherein the retrieval tether of the first aft set causes the second aft winch portion to rotate in the second winding direction, wherein the first aft one-way clutch prevents the rotation of the shaft when the second aft winch portion rotates in the second winding direction, wherein the rotation of the second aft winch portion in the second winding direction causes the first aft winch portion to rotate in the second winding direction, and the rotation of the first aft winch portion in the second winding direction causes the driving tether of the first aft set to wind onto the first aft winch portion.

11. The converter of claim 10, wherein when the aft paddle moves down the aft guide rails, the driving tether of the first aft set causes the first aft winch portion to rotate in the first winding direction, wherein the rotation of the first aft winch portion in the first winding direction causes the shaft to rotate in the first direction of the shaft, wherein the rotation of the shaft in the first direction of the shaft generates electricity through the generator, wherein the rotation of the first aft winch portion in the first winding direction causes the second aft winch portion to rotate in the first winding direction, wherein the rotation of the second aft winch portion in the first winding direction causes the retrieval tether of the first aft set to wind onto the second aft winch portion, wherein the retrieval tether of the second aft set causes the fourth aft winch portion to rotate in the second winding direction, wherein the second one-way clutch prevents the rotation of the shaft when the fourth aft winch portion rotates in the second winding direction, wherein the rotation of the fourth aft winch portion in the second winding direction causes the third aft winch portion to rotate in the second winding direction, and wherein the rotation of the third aft winch portion in the second winding direction causes the driving tether of the second aft set to wind onto the third aft winch portion.

12. A modular wave energy converter, comprising:

a power take-off system, the power take-off system comprising a shaft, the shaft being coupled to a generator;

a forward attachment frame coupled to a forward side, the forward attachment frame comprising:

a forward rectangular shaped frame portion, comprising a first forward vertical bar, a second forward vertical bar, a forward top horizontal bar, and a forward bottom horizontal bar of the forward rectangular shaped frame portion;

a first forward triangular shaped frame portion, comprising:

a first forward horizontal bar and a first forward inclined bar,
    wherein the first forward horizontal bar comprises a first end and a second end, the first end of the first forward horizontal bar coupled to a bottom of the first forward vertical bar of the forward rectangular shaped frame portion, and the second end of the first forward horizontal bar projecting outward from the bottom of the first forward vertical bar of the forward rectangular shaped frame portion,
    wherein the first forward inclined bar comprises a first end and a second end, the first end of the first forward inclined bar coupled to a top of the first forward vertical bar of the forward rectangular shaped frame portion, and the second end of the first forward inclined bar coupled to the second end of the first forward horizontal bar;
a second forward triangular shaped frame portion, comprising:
    a second forward horizontal bar and a second forward inclined bar,
    wherein the second forward horizontal bar comprises a first end and a second end, the first end of the second forward horizontal bar coupled to a bottom of the second forward vertical bar of the forward rectangular shaped frame portion, and the second end of the second forward horizontal bar projecting outward from the bottom of the second forward vertical bar of the forward rectangular shaped frame portion,
    wherein the second forward inclined bar comprises a first end and a second end, the first end of the second forward inclined bar coupled to a top of the second forward vertical bar of the forward rectangular shaped frame portion, and the second end of the second forward inclined bar coupled to the second end of the second forward horizontal bar,
    a forward bottom bar comprising a first end and a second end, the first end of the forward bottom bar coupled to the second end of the first forward inclined bar, and the second end of the forward bottom bar coupled to the second end of the second forward inclined bar; and
a plurality of forward guide rails comprising top ends and bottom ends, the top ends of the forward guide rails coupled to the forward top horizontal bar of the forward rectangular shaped frame portion and the bottom ends of the forward guide rails are coupled to the forward bottom bar;
a forward paddle coupled to the forward guide rails between the top ends of the forward guide rails and the bottom ends of the forward guide rails, the forward paddle configured to move up and down the forward guide rails;
one or more forward tethers coupled to the forward paddle and the shaft,
wherein in response to a combination of heave and surge forces from waves of water, the forward paddle moves up and down the forward guide rails,
wherein the movement of the forward paddle moves the one or more forward tethers,
wherein the movement of the one or more forward tethers causes the shaft to rotate.

13. The converter of claim 12, wherein the forward paddle is positioned vertically.

14. The converter of claim 12, wherein the forward paddle is inclined.

15. The converter of claim 12, further comprising:
an aft attachment frame coupled to an aft side, the aft attachment frame comprising:
    an aft rectangular shaped frame portion, comprising a first aft vertical bar, a second aft vertical bar, an aft top horizontal bar, and an aft bottom horizontal bar of the aft rectangular shaped frame portion;
    a first aft triangular shaped frame portion, comprising:
        a first aft horizontal bar and a first aft inclined bar,
        wherein the first aft horizontal bar comprises a first end and a second end, the first end of the first aft horizontal bar coupled to a bottom of the first aft vertical bar of the aft rectangular shaped frame portion, and the second end of the first aft horizontal bar projecting outward from the bottom of the first aft vertical bar of the aft rectangular shaped frame portion,
        wherein the first aft inclined bar comprises a first end and a second end, the first end of the first aft inclined bar coupled to a top of the first aft vertical bar of the aft rectangular shaped frame portion, and the second end of the first aft inclined bar coupled to the second end of the first aft horizontal bar;
    a second aft triangular shaped frame portion, comprising:
        a second aft horizontal bar and a second aft inclined bar,
        wherein the second aft horizontal bar comprises a first end and a second end, the first end of the second aft horizontal bar coupled to a bottom of the second aft vertical bar of the aft rectangular shaped frame portion, and the second end of the second aft horizontal bar projecting outward from the bottom of the second aft vertical bar of the aft rectangular shaped frame portion,
        wherein the second aft inclined bar comprises a first end and a second end, the first end of the second aft inclined bar coupled to a top of the second aft vertical bar of the aft rectangular shaped frame portion, and the second end of the second aft inclined bar coupled to the second end of the second aft horizontal bar,
    an aft bottom bar comprising a first end and a second end, the first end of the aft bottom bar coupled to the second end of the first aft inclined bar, and the second end of the aft bottom bar coupled to the second end of the second aft inclined bar; and
a plurality of aft guide rails comprising top ends and bottom ends, the top ends of the aft guide rails coupled to the aft top horizontal bar of the aft rectangular shaped frame portion and the bottom ends of the aft guide rails are coupled to the aft bottom bar;
an aft paddle coupled to the aft guide rails between the top ends of the aft guide rails and the bottom ends of the aft guide rails, the aft paddle configured to move up and down the aft guide rails;
one or more aft tethers coupled to the aft paddle and the shaft,
wherein in response to the combination of heave and surge forces from waves of water, the aft paddle moves up and down the aft guide rails,
wherein the movement of the aft paddle moves the one or more aft tethers, wherein the movement of the one or more aft tethers causes the shaft to rotate.

16. The converter of claim 15, wherein the aft paddle is positioned vertically.

17. The converter of claim 15, wherein the aft paddle is inclined.

\* \* \* \* \*